United States Patent [19]
Breese et al.

[11] Patent Number: 5,987,415
[45] Date of Patent: Nov. 16, 1999

[54] MODELING A USER'S EMOTION AND PERSONALITY IN A COMPUTER USER INTERFACE

[75] Inventors: John S. Breese, Mercer Island; John Eugene Ball, Woodinville, both of Wash.

[73] Assignee: Microsoft Corporation, Redmond, Wash.

[21] Appl. No.: 09/109,233

[22] Filed: Jun. 30, 1998

Related U.S. Application Data

[62] Division of application No. 09/047,160, Mar. 23, 1998.

[51] Int. Cl.$^6$ ....................................................... G10L 3/00
[52] U.S. Cl. ........................................... 704/270; 704/275
[58] Field of Search ............................... 704/270; 395/10

[56] References Cited

U.S. PATENT DOCUMENTS 5,241,621  8/1993  Smart ........................................ 395/51

OTHER PUBLICATIONS

Heckerman, David, Breese, John, Rommelse, Koos, "Decision–Theoretic Troubleshooting," *Communications of the ACM*, vol. 38, No. 3, Mar. 1995, pp. 49–57.

Jensen, Finn V., "An Introduction to Bayesian Networks," *UCL Press Limited*, London, 1996, pp. 1–31.

Lang, Peter J., "The Emotion Probe: Studies of Motivation and Attention," *American Psychologist*, vol. 50, No. 5, May 1995, pp. 372–385.

McCrae, Robert R. and Costa, Jr., Paul T., "The Structure of Interpersonal Traits: Wiggin's Circumplex and the Five–Factor Model," *Journal of Personality and Social Psychology*, vol. 56, No. 4, 1989, pp. 586–595.

Picard, Rosalind, "Affective Computing," *MIT Press*, Cambridge, Massachusetts, 1997, pp. 165–226.

Reeves, Byron and Nass, Clifford, "The Media Equation: How People Treat Computers, Television, and New Media Like Real People and Places," *Cambridge University Press*, Cambridge, Massachusetts, 1996, pp. 75–139.

*Primary Examiner*—David R. Hudspeth
*Assistant Examiner*—Robert Louis Sax
*Attorney, Agent, or Firm*—Michaelson & Wallace

[57] ABSTRACT

The invention is embodied in a computer user interface including an observer capable of observing user behavior, an agent capable of conveying emotion and personality by exhibiting corresponding behavior to a user, and a network linking user behavior observed by said observer and emotion and personality conveyed by said agent. The network can include an observing network facilitating inferencing user emotional and personality states from the behavior observed by the observer as well as an agent network facilitating inferencing of agent behavior from emotion and personality states to be conveyed by the agent. In addition, a policy module can dictate to the agent network desired emotion and personality states to be conveyed by the agent based upon user emotion and personality states inferred by the observing network. Typically, each network is a stochastic model. Each stochastic model is preferably a Bayesian network, so that the observing network is a first Bayesian network while the agent network is a second Bayesian network. Generally, the first and second Bayesian networks are similar copies of one another. Each of the two Bayesian networks include a first layer of multi-state nodes representing respective emotional and personality variables, and a second layer of multi-state nodes representing respective behavioral variables. Each one of the nodes includes probabilities linking each state in the one node with states of others of the nodes. More specifically, each one of the nodes in the first layer includes probabilities linking the states of the one first layer node to the states of nodes in the second layer. Similarly, each one of the nodes in the second layer include probabilities linking the states of the one second layer node to states of nodes in the first layer.

21 Claims, 13 Drawing Sheets

Assess probabilities for: Greetterse

Greetterse

| greet | true | false |
|---|---|---|
| hello | .60 | .40 |
| hi there | .07 | .93 |
| howdy | .14 | .86 |
| greetings | .15 | .85 |
| hey | .93 | .07 |

Ok  Cancel

FIG. 5A

GreetActive

| greet | true | false |
|---|---|---|
| Hi | .74 | .26 |
| Good%daypart% | .48 | .52 |
| Hello | .72 | .28 |
| Oh, you again. | .24 | .76 |
| Good to see you again | .25 | .75 |
| Hi there | .50 | .50 |

Ok  Cancel

FIG. 5B

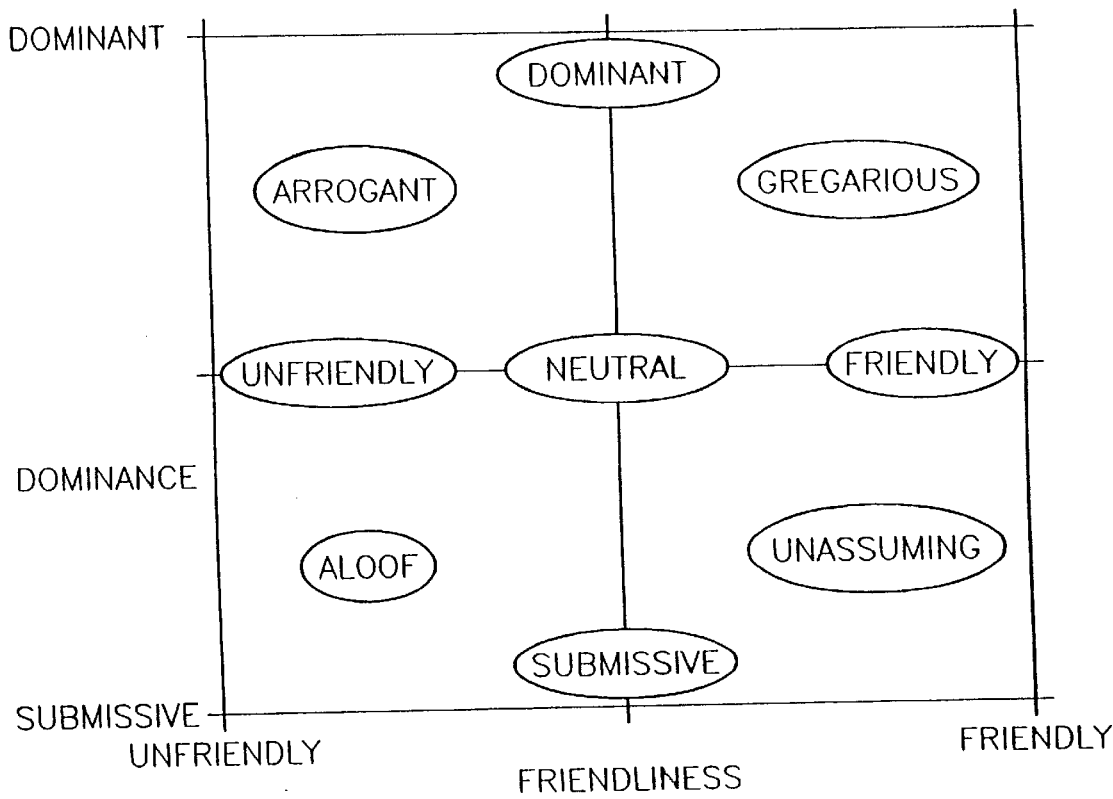
FIG. 10
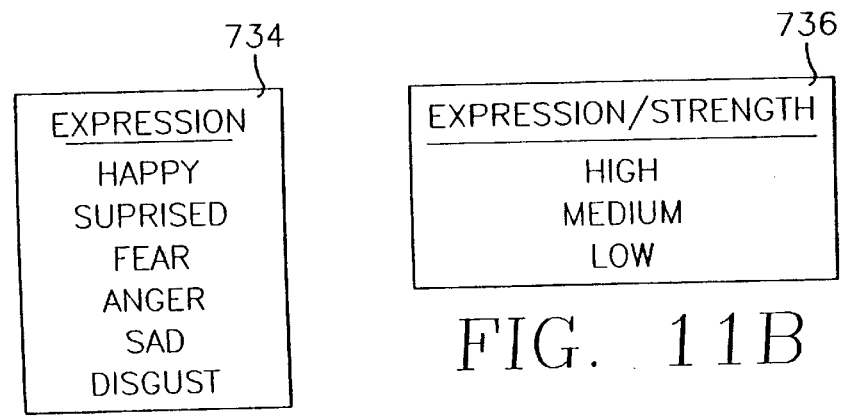
FIG. 11A
FIG. 11B

| FACIAL EXPRESSION 702 | E-VALENCE 704 | E-AROUSAL | P-FRIENDLY 706 | HAPPY 734a | SURPRISE 734b | FEAR 734c | ANGER 734d | SAD 734e | DISGUST 734f |
|---|---|---|---|---|---|---|---|---|---|
| | NEGATIVE | PASSIVE | UNFRIENDLY | .02 | .02 | .25 | .36 | .22 | .12 |
| | | | NEUTRAL | .02 | .02 | .33 | .29 | .26 | .08 |
| | | | FRIENDLY | .02 | .02 | .36 | .23 | .32 | .05 |
| | | NEUTRAL | UNFRIENDLY | .02 | .04 | .23 | .42 | .15 | .15 |
| | | | NEUTRAL | .02 | .04 | .24 | .44 | .18 | .10 |
| | | | FRIENDLY | .02 | .04 | .29 | .38 | .20 | .08 |
| | | EXCITED | UNFRIENDLY | .02 | .08 | .15 | .44 | .11 | .20 |
| | | | NEUTRAL | .02 | .08 | .18 | .49 | .12 | .10 |
| | | | FRIENDLY | .02 | .08 | .22 | .45 | .17 | .06 |
| | NEUTRAL | PASSIVE | UNFRIENDLY | .12 | .21 | .15 | .15 | .22 | .15 |
| | | | NEUTRAL | .36 | .13 | .13 | .13 | .13 | .13 |
| | | | FRIENDLY | .68 | .07 | .06 | .06 | .06 | .06 |
| | | NEUTRAL | UNFRIENDLY | .10 | .17 | .17 | .17 | .22 | .17 |
| | | | NEUTRAL | .26 | .13 | .15 | .16 | .16 | .13 |
| | | | FRIENDLY | .53 | .09 | .10 | .10 | .10 | .08 |
| | | EXCITED | UNFRIENDLY | .05 | .18 | .18 | .18 | .23 | .18 |
| | | | NEUTRAL | .17 | .17 | .17 | .17 | .17 | .17 |
| | | | FRIENDLY | .31 | .14 | .14 | .14 | .14 | .14 |
| | POSITIVE | PASSIVE | UNFRIENDLY | .15 | .18 | .15 | .15 | .21 | .15 |
| | | | NEUTRAL | .28 | .21 | .13 | .13 | .13 | .13 |
| | | | FRIENDLY | .49 | .17 | .08 | .08 | .08 | .08 |
| | | NEUTRAL | UNFRIENDLY | .30 | .19 | .12 | .12 | .15 | .12 |
| | | | NEUTRAL | .47 | .15 | .09 | .09 | .09 | .09 |
| | | | FRIENDLY | .59 | .13 | .07 | .07 | .07 | .07 |
| | | EXCITED | UNFRIENDLY | .38 | .18 | .10 | .10 | .13 | .10 |
| | | | NEUTRAL | .63 | .12 | .06 | .06 | .06 | .06 |
| | | | FRIENDLY | .84 | .07 | .02 | .02 | .02 | .02 |

FIG. 12

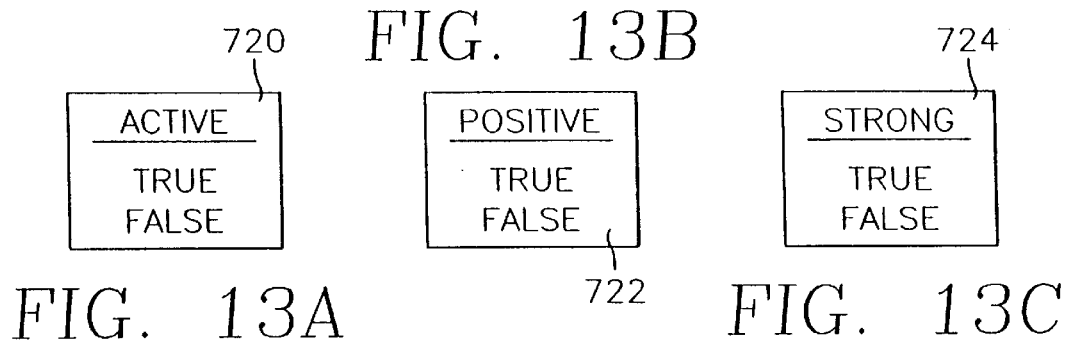
FIG. 13B
FIG. 13A    FIG. 13C
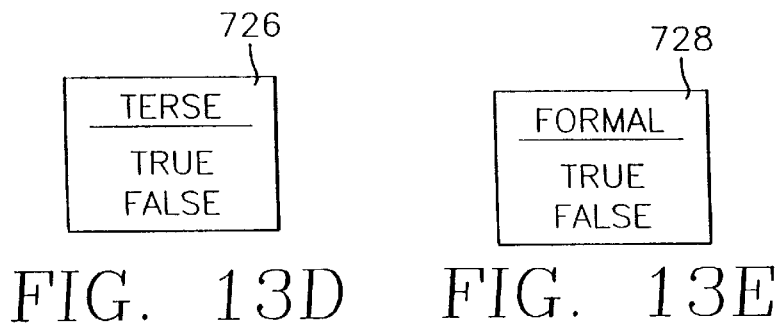
FIG. 13D    FIG. 13E
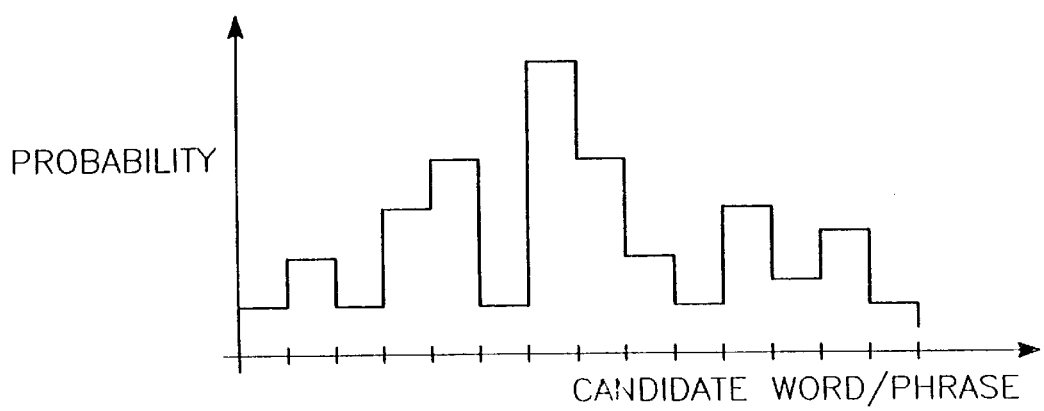
FIG. 15

MODELING A USER'S EMOTION AND PERSONALITY IN A COMPUTER USER INTERFACE

This is a divisional of application Ser. No. 09/047,160, filed Mar. 23, 1998.

BACKGROUND OF THE INVENTION

1. Technical Field

Within the human-computer interaction community there a growing consensus that traditional WIMP (windows, icons, mouse, and pointer) interfaces need to become more flexible, adaptive, and human-oriented. Simultaneously, technologies such as speech recognition, text-to-speech, video input, and advances in computer graphics are providing increasingly rich tools to construct such user interfaces. These trends are driving growing interest in agent- or character-based user interfaces exhibiting quasi-human appearance and behavior.

2. Background Discussion

One aspect of developing such a capability is the ability of the system to recognize the emotional state and personality of the user and respond appropriately. Research has shown that users respond emotionally to their computers. Emotion and personality are of interest to us primarily because of the ways in which they influence behavior, and precisely because those behaviors are communicative—in human dialogues they establish a channel of social interaction that is crucial to the smoothness and effectiveness of the conversation. In order to be an effective communicant, a computer character needs to respond appropriately to these signals from the user and should produce its own emotional signals that reinforce, rattler than confuse, its intended communication.

There are two crucial issues on the path to what has been termed "affective computing":

(1) providing a mechanism to infer the likely emotional state and personality of the user, and (2) providing a mechanism to generate behavior in an agent (.e.g. speech and gesture) consistent with a desired personality and emotional state.

A Command and Control Agent:

Imagine a diagnostic session where a user is having trouble printing and an automated, speech-enabled agent is providing assistance. The agent asks a few informational questions and then makes a suggestion "Please try the following. Go to your printer and make sure all cables are plugged in properly and the printer is turned on and is online." The user checks this and returns, replying "No dice, it still doesn't print."Due to the failure of the speech recognition system to recognize "dice", the agent responds "I'm sorry, I did not understand. Please repeat yourself." The user responds, in a some what faster and louder tone, "I said it didn't work! What should I try next?" The agent, noting the speed, volume, intonation, and wording of the utterance now has an increased probability that the user is upset, and a slightly increased belief that the person is a dominant personality. In response, the agent could decide to be either extremely submissive and apologetic for its failings so far, or respond in kind in a terse, confident fashion. The agent chooses the second path. "OK, I'm doing the best I can. Try switching the printer off and back on, and try printing again," it replies, in a somewhat less courteous manner than the previous suggestion.

This dialogue is an example of a command and control interface, in that at each stage there are relatively few alternatives that the agent (or speech recognizer) needs to consider. In the scenario we are considering, at any point the agent need only consider responses to the previous question, as well as a few generic responses (e.g. quit). As we will see, the recognition and generation of alternative phrasings for these speech acts will provide the basis for an affective infrastructure for the agent.

A goal of the present invention is an architecture which is appropriate for a broad range of tasks that are amenable to such command and control interfaces. Such an architecture would not attempt to manipulate the probabilistic characteristics of the language model used by the speech recognition engine, but rather would interpret the various possible rephrasings of a fixed set of alternatives in terms of emotion and personality.

Bayesian Networks Employed in Carrying Out the Invention:

The advent of artificial intelligence within computer science has brought an abundance of decision-support systems. Decision-support systems are computer systems in which decisions, typically rendered by humans, are recommended and sometimes made. In creating decision-support systems, computer scientists seek to provide decisions with the greatest possible accuracy. Thus, computer scientists strive to create decision-support systems that are equivalent to or more accurate than a human expert. Applications of decision-support systems include medical diagnosis, troubleshooting computer networks, or other systems wherein a decision is based upon identifiable criteria.

One of the most promising new areas for research in decision-support systems is Bayesian networks. A Bayesian network is a representation of the probabilistic relationships among distinctions about the world. Each distinction, sometimes called a variable, can take on one of a mutually exclusive and exhaustive set of possible states. A Bayesian network is expressed as an acyclic-directed graph where the variables correspond to nodes and the relationships between the nodes correspond to arcs. A simple example of a Bayesian network can have three variables, $X_1$, $X_2$, and $X_3$, which are represented by three respective nodes with arcs connecting the nodes to reflect the various causal relationships. Associated with each variable in a Bayesian network is a set of probability distributions. Using conditional probability notation, the set of probability distributions for a variable can be denoted by $p(x_i|\Pi_i, \zeta)$, where "p" refers to the probability distribution, where "$\Pi_i$" denotes the parents of variable $X_i$ and where "$\zeta$" denotes the knowledge of the expert. The Greek letter "$\zeta$" indicates that the Bayesian network reflects the knowledge of an expert in a given field. Thus, this expression reads as follows: the probability distribution for variable $X_i$ given the parents of $X_i$ and the knowledge of the expert. For example, $X_1$ is the parent of $X_2$. The probability distributions specify the strength of the relationships between variables. For instance, if $X_1$ has two states (true and false), then associated with $X_1$ is a single probability distribution $p(x_1|\zeta)$ and associated with $X_2$ are two probability distributions $p(x_2|x_1=t, \zeta)$ and $p(x_2|x_1=f, \zeta)$ The arcs in a Bayesian network convey dependence between nodes. When there is an arc between two nodes, the probability distribution of the first node depends upon the value of the second node when the direction of the arc points from the second node to the first node. In this case, the nodes are said to be conditionally dependent. Missing arcs in a Bayesian network convey conditional independencies. For example, two nodes may be conditionally independent given another node. However, two variables indirectly connected through intermediate variables are conditionally dependent given lack of knowledge of the values ("states") of the intermediate variables. Therefore, if the value for the other node is known, the two nodes are conditionally dependent.

In other words, sets of variables X and Y are said to be conditionally independent, given a set of variables Z, if the probability distribution for X given Z does not depend on Y. If Z is empty, however, X and Y are said to be "independent" as opposed to conditionally independent. If X and Y are not conditionally independent, given Z, then X and Y are said to be conditionally dependent given Z.

The variables used for each node may be of different types. Specifically, variables may be of two types: discrete or continuous. A discrete variable is a variable that has a finite or countable number of states, whereas a continuous variable is a variable that has an uncountably infinite number of states. All discrete variables considered in this specification have a finite number of states. An example of a discrete variable is a Boolean variable. Such a variable can assume only one of two states: "true" or "false." An example of a continuous variable is a variable that may assume any real value between −1 and 1. Discrete variables have an associated probability distribution. Continuous variables, however, have an associated probability density function ("density"). Where an event is a set of possible outcomes, the density p(x) for a variable "x" and events "a" and "b" is defined as:

$$p(x) = \lim_{a \to b}\left[\frac{p(a \le x \le b)}{|(a-b)|}\right]$$

where p(a≦x≦b) is the probability that x lies between a and b. Conventional systems for generating Bayesian networks cannot use continuous variables in their nodes.

A Bayesian network could be constructed for troubleshooting automobile problems. Such a Bayesian network would contain many variables or nodes relating to whether an automobile will work properly, and arcs connecting the causally related nodes. A few examples of the relationships between the variables follow. For the radio to work properly, there must be battery power. Battery power, in turn, depends upon the battery working properly and a charge. The battery working properly depends upon the battery age. The charge of the battery depends upon the alternator working properly and the fan belt being intact. The battery age variable, whose values Lie from zero to infinity, is an example of a continuous variable that can contain an infinite number of values. However, the battery variable reflecting the correct operations of the battery is a discrete variable being either true or false.

Such an automobile troubleshooting Bayesian network also provides a number of examples of conditional independence and conditional dependence. The nodes operation of the lights and battery power are dependent, and the nodes operation of the lights and operation of the radio are conditionally independent given battery power. However, the operation of the radio and the operation of the lights are conditionally dependent. The concept of conditional dependence and conditional independence can be expressed using conditional probability notation. For example, the operation of the lights is conditionally dependent on battery power and conditionally independent of the radio given the battery power. Therefore, the probability of the lights working properly given both the battery power and the radio is equivalent to the probability of the lights working properly given the battery power alone, P(Lights|Battery Power, Radio)=P(Lights|Battery Power). An example of a conditional dependence relationship is the probability of the lights working properly given the battery power which is not equivalent to the probability of the lights working properly given no information. That is, p(Lights|Battery Power)≠p(Lights).

There are two conventional approaches for constructing Bayesian networks. Using the first approach ("the knowledge-based approach"), a person known as a knowledge engineer interviews an expert in a given field to obtain the knowledge of the expert about the field of expertise of the expert. The knowledge engineer and expert first determine the distinctions of the world that are important for decision making in the field of the expert. These distinctions correspond to the variables of the domain of the Bayesian network. The "domain" of a Bayesian network is the set of all variables in the Bayesian network. The knowledge engineer and the expert next determine the dependencies among the variables (the arcs) and the probability distributions that quantify the strengths of the dependencies.

In the second approach ("called the data-based approach"), the knowledge engineer and the expert first determine the variables of the domain. Next, data is accumulated for those variables, and an algorithm is applied that creates a Bayesian network from this data. The accumulated data comes from real world instances of the domain. That is, real world instances of actions and observations in a given field. The current invention can utilize bayesian networks constructed by either or both of these approaches.

After the Bayesian network has been created, the Bayesian network becomes the engine for a decision-support system. The Bayesian network is converted into a computer-readable form, such as a file and input into a computer system. Then, the computer system uses the Bayesian network to determine the probabilities of variable states given observations, determine the benefits of performing tests, and ultimately recommend or render a decision. Consider an example where a decision-support system uses the automobile troubleshooting Bayesian network of the foregoing example to troubleshoot automobile problems. If the engine for an automobile did not start, the decision-based system can calculate the probabilities of all states for all variables in the network. Furthermore, it could request an observation of whether there was gas, whether the fuel pump was in working order by possibly performing a test, whether the fuel line was obstructed, whether the distributor was working, and whether the spark plugs were working. While the observations and tests are being performed, the Bayesian network assists in determining which variable should be observed next, based on identifying that variable that will do the most to reduce the uncertainty (modulo cost) regarding variables of concern.

Such Bayesian networks are examples of the broader class of stochastic models, characterized by using probabilities to link various causal relationships, with which the present invention may be carried out.

SUMMARY OF THE INVENTION

The invention is embodied in a computer user interface including an observer capable of observing user behavior, an agent capable of conveying emotion and personality by exhibiting corresponding behavior to a user, and a network linking user behavior observed by said observer and emotion and personality conveyed by said agent. The network can include an observing network facilitating inferencing user emotional and personality states from the behavior observed by the observer as well as an agent network facilitating inferencing of agent behavior from emotion and personality states to be conveyed by the agent. In addition, a policy module can dictate to the agent network desired emotion and personality states to be conveyed by the agent based upon user emotion and personality states inferred by the observing network.

Typically, each network is a stochastic model. Each stochastic model is preferably a Bayesian network, so that the observing network is a first Bayesian network while the agent network is a second Bayesian network. Generally, the first and second Bayesian networks are similar copies of one another.

Each of the two Bayesian networks include a first layer of multi-state nodes representing respective emotional and personality variables, and a second layer of multi-state nodes representing respective behavioral variables. Each one of the nodes includes probabilities linking each state in the one node with states of others of the nodes. Second layer probabilities depend on the states in the first layer, reflecting our modeling assumption that emotions/personalities cause behavioral variables. The first layer variables may depend on external factors or previous values of themselves (i.e my mood now depends on what it was 20 seconds ago.

The multi-state nodes representing emotional and personality variables include a valence node, an arousal node, a friendliness node and a dominance node. The multi-state nodes representing behavior variables include speech attributes nodes, facial expression nodes, and a set of word attribute nodes.

The set of word attribute nodes have probabilities relating states of the emotional and personality nodes to a set of corresponding word attributes, and the user interface further includes a language submodel coupled to tie word attribute nodes, and a word node coupled to the language submodel. The set of word attribute nodes include a terseness node, a positiveness node, an activeness node, a strength node and a formality node.

The language submodel includes a word attribute layer relating individual word expressions to probabilities of conveying particular ones of the set of word attributes, and a scoring layer relating states of the word attribute layer for a particular word expression to states of corresponding ones of the set of word attribute nodes of the network. In addition, a match module selects the one word expression having the winning score computed by the scoring layer. In one implementation, the winning score is the highest product of matches between states of the word attribute layer of the language submodel and states of the word attribute nodes of the network.

BRIEF DESCRIPTION OF THE DRAWINGS

FIGS. 5A and 5B illustrate two examples of nodes modeling the relationship between paraphrases and a given intent in the language submodel of FIG. 3.

FIG. 10 illustrates the 2-dimensional personality space implemented in the personality nodes of the network of FIG. 7.

FIGS. 11A and 11B tabulate the states of the expression and expression strength nodes of the network of FIG. 7.

FIG. 12 illustrates the structure of the expression node of the network of FIG. 7.

FIGS. 13A, 13B, 13C, 13D and 13E tabulate the states of the five word interpretation nodes, namely the positive, active, strong, terse and formal nodes, of the network of FIG. 7.

FIG. 15 is a graph illustrating the distribution of probabilities across a set of candidate phrases in the language model of FIG. 14.

DETAILED DESCRIPTION OF THE PREFERRED EMBODIMENTS

Figure 1:
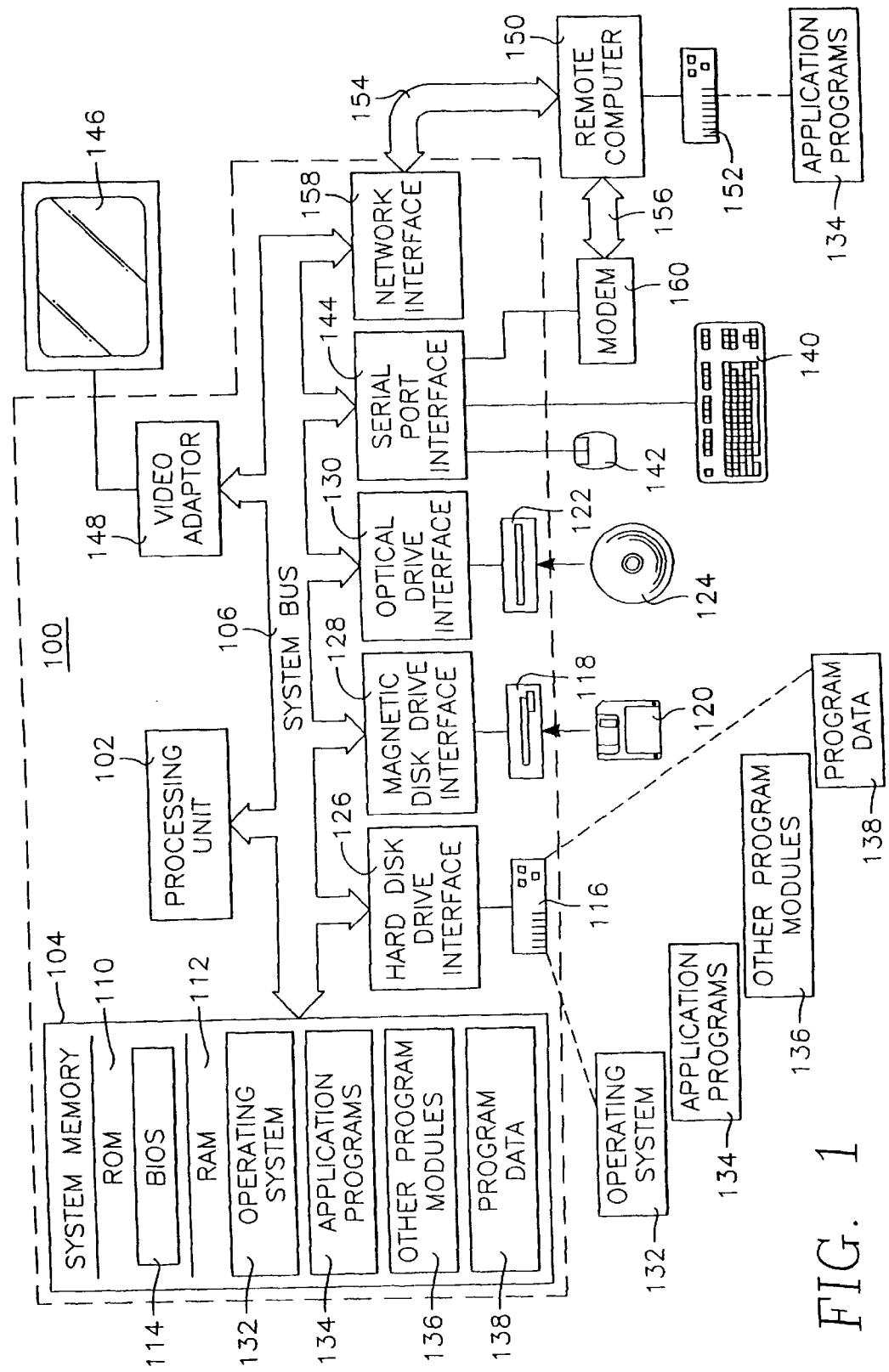
FIG. 1 is a block diagram illustrating an exemplary computer system for carrying out the present invention.

A Computer System for Carrying Out the Invention:

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include processes, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located both local and remote memory storage devices.

With reference to FIG. 1, an exemplary system for implementing the invention includes a general purpose computing device in the form of a conventional personal computer 120, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system 126 (BIOS), containing the basic process that helps to transfer information between elements within the personal computer 120, such as during start-up, is stored in ROM 124. The personal computer 120 further includes a hard disk drive 127 for reading from and writing to a hard disk, not shown, a magnetic disk drive 128 for reading from or writing to a removable magnetic disk 129, and an optical disk drive 130 for reading from or writing to a removable optical disk 131 such as a CD ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide nonvolatile storage of computer readable instructions, data structures, program modules and other data for the personal computer 120. Although the exemplary environment described herein employs a hard disk, a removable magnetic disk 129 and a removable optical disk 131, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 129, optical disk 131, ROM 124 or RAM 125, including an operating system 135, one or more application programs 136, other program modules 13-7, and program data 138. A user may enter commands and information into the personal computer 120 through input devices such as a keyboard 140 and pointing device 142. Other input devices (not shown) may include a microphone, joystick, game pad, satellite dish, scanner, or the like. These and other input devices are often connected to the processing unit 121 through a serial port interface 146 that is coupled to the system bus, but may be connected by other interfaces, such as a parallel port, game port or a universal serial bus (USB). A monitor 147 or other type of display device is also connected to the system bus 123 via an interface, such as a video adapter 148. In addition to the monitor, personal computers typically include other peripheral output devices (not shown), such as speakers and printers.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets and Internet.

When used in a LAN networking environment, the personal computer 120 is connected to the local network 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Introduction to the Basic Concept of the Invention:

The invention is embodied in a system and architecture for constructing a character-based agent based on speech and graphical interactions. The architecture uses models of emotions and personality encoded as Bayesian networks to 1) diagnose the emotions and personality of the user, and 2) generate appropriate behavior by an automated agent in response to the user's input. Classes of interaction that are interpreted and/or generated include such things as (1) word choice and syntactic framing of utterances, (2) speech pace, rhythm, and pitch contour, and (3) gesture, expression, and body language.

Modeling Emotions and Personality:

The understanding of emotion and personality is the focus of an extensive psychology literature. A current implementation of the present invention adopts a simple model in which current emotional state and long term personality style are characterized by discrete values along a small number of dimensions. These internal states are then treated as unobservable variables in a Bayesian network model. The invention constructs model dependencies based on purported causal relations from these unobserved variables to observable quantities (expressions of emotion and personality) such as word choice, facial expression, speech speed, etc.

Bayesian networks are an appropriate tool due to the uncertainty inherent in this domain. In addition, as discussed below, Bayesian networks can enable causal inference (from causes to effects) as well as diagnostic reasoning (from effects to causes), which is directly applicable in this domain. Finally, the flexibility of dependency structures expressible within the Bayesian net framework makes it possible to integrate various aspects of emotion and personality in a single model that is easily extended and modified.

Emotion is the term used in psychology to describe short-term variations in internal mental state, including both physical responses like fear, and cognitive responses like jealousy. A current implementation of the invention focuses on two basic dimensions of emotional response that can usefully characterize nearly any experience:

(1) Valence: Valence represents overall happiness encoded as positive (happy), neutral, or negative (sad).

(2) Arousal: Arousal represents the intensity level emotion, encoded as excited, neutral, or passive.

Personality characterizes the long-term patterns of thought, emotion, and behavior associated with an individual. Psychologists have characterized five basic dimensions of personality, which form the basis of commonly used personality tests. The current implementation of the invention models the two traits that appear to be most critical to interpersonal relationships:

(1) Dominance: Dominance indicates a disposition toward controlling or being controlled by others, encoded as dominant, neutral, or submissive.

(2) Friendliness: Friendliness measures the tendency to be warm and sympathetic, and is encoded as friendly, neutral, or unfriendly.

Psychologists have devised laboratory tests which can reliably measure both emotional state (with physiological sensing such as galvanic skin response and heart rate) and personality (with tests such as the Myers-Briggs Type Indicator). A computer-based agent does not have these "sensors" at its disposal, so alternative sources of information must be used.

Figure 2:
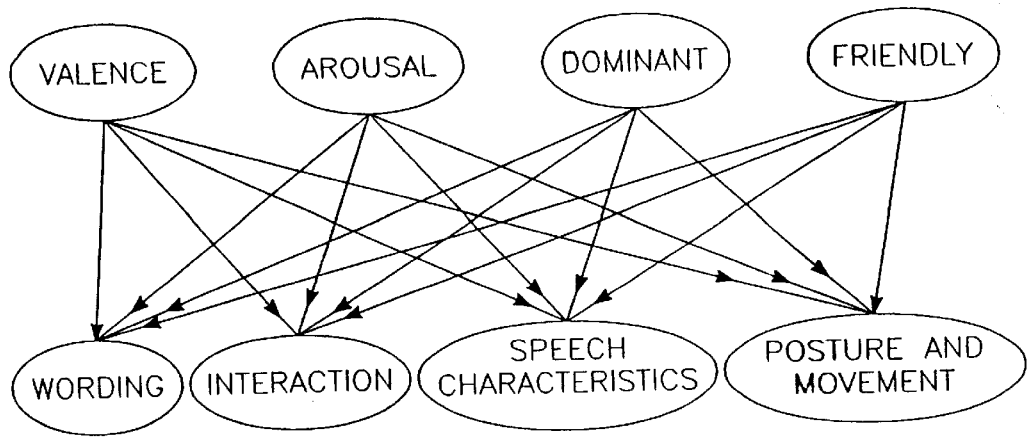
FIG. 2 is a simplified block diagram of a Bayesian network of the present invention for modeling the relationship between emotion/personality and behavior.

The Bayesian network embodying the present invention therefore integrates information from a variety of observable linguistic and non-linguistic behaviors as shown in FIG. 2. Various classes of these observable effects of personality and emotion are shown in FIG. 2. This specification discusses below the range of non-linguistic signals that can be accommodated by the model employed to implement the present invention. The specification below then describes in more detail the way in which the Bayesian network represents the effects of personality and emotion on linguistic expression.

Non-Linguistic Expression:

Humans communicate their emotional state constantly through a variety of non-verbal behaviors, ranging from explicit (and sometimes conscious) signals like smiles and frowns, to subtle (and unconscious) variations in speech rhythm or body posture. Moreover, people are correspondingly sensitive to the signals produced by others, and can frequently assess the emotional states of one another accurately even though they may be unaware of the observations that prompted their conclusions.

The range of non-linguistic behaviors that transmit information about personality and emotion is quite large. We have only begun to consider them carefully, and list here just a few of the more salient examples. Emotional arousal affects a number of (relatively) easily observed behaviors, including speech speed and amplitude, the size and speed of gestures, and some aspects of facial expression and posture. Emotional valence is signalled most clearly by facial expression, but can also be communicated by means of the pitch contour and rhythm of speech. Dominant personalities might be expected to generate characteristic rhythms and amplitude of speech, as well as assertive postures and gestures. Friendliness will typically be demonstrated through facial expressions, speech prosody, gestures and posture.

The observation and classification of emotionally communicative behaviors raises many challenges, ranging from simple calibration issues (e.g. speech amplitude) to gaps in psychological understanding (e.g. the relationship between body posture and personality type). However, in many cases the existence of a causal connection is uncontroversial, and given an appropriate sensor (e.g. a gesture size estimator from camera input), the addition of a new source of information to our model will be fairly straightforward.

Within the framework of the Bayesian network of FIG. 2, it is a simple matter to introduce a new source of information into the model. For example, suppose we incorporate a new speech recognition engine that reports the pitch range of the fundamental frequencies in each utterance (normalized for a given speaker). We could add a new network node that represents PitchRange with a few discrete values, and then construct causal links from any emotion or personality nodes that we expect to affect this aspect of expression. In this case, a single link from Arousal to PitchRange would capture the significant dependency. Then the model designer would es inmate the distribution of pitch ranges for each level of emotional arousal, to capture the expectation that increased arousal leads to generally raised pitch. The augmented model would then be used both to recognize that increased pitch may indicate emotional arousal in the user, as well as adding to the expressiveness of a computer character by enabling it to communicate heightened arousal by adjusting the base pitch of its synthesized speech.

Selection of Words and Phrases:

A key method of communicating emotional state is by choosing among semantically equivalent, but emotionally diverse paraphrases—for example, the difference between responding to a request with "sure thing", "yes", or "if you insist". Similarly, an individual's personality type will frequently influence their choice of phrasing, e.g.: "you should definitely" versus "perhaps you might like to".

We have modeled wording choice more deeply than other aspects of the emotion and personality. Since we are concerned with command and control, we have focused on spoken commands. The emotional and personality content is reflected in how someone will express a given concept. Associated with each concept is a set of alternative expressions or paraphrases. Some examples are shown in Table I.

TABLE I

| Concept | Paraphrases | | |
|---|---|---|---|
| greeting | hello | greetings | |
| | hi there | hey | howdy |
| yes | yes | absolutely | yeah |
| | I guess so | I think so | for sure |
| suggest | I suggest that you | | you should |
| | perhaps you would like to | | let's |
| | maybe you could | | |

Figure 3:
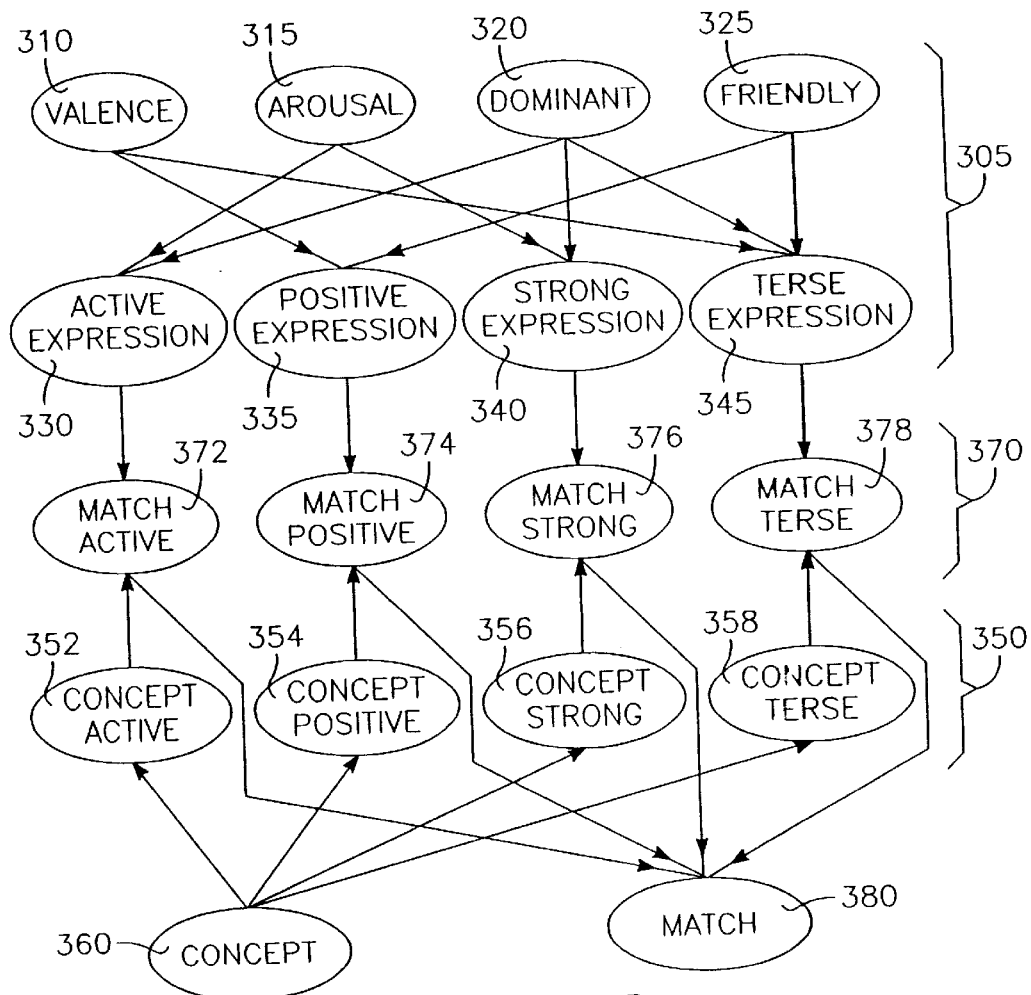
FIG. 3 is a block diagram of a fragment of a language submodel in the Bayesian network of FIG. 2 for modeling the relationship between emotion and intent, the relationship between paraphrase and intent and the likelihood a paraphrase matches a particular intent.

The preferred embodiment of the invention models the influence of emotion and personality on wording choice in two stages of a Bayesian network, as shown in FIG. 3. The first stage captures the relationship between personality and emotion and various classes of expressive style. The first stage 305, in the current implementation of the invention, consists of a first layer of nodes 310, 315, 320, 325 representing (respectively) the emotional/personality states of valence, arousal, dominance and friendliness and a second layer of nodes 330, 335, 340, 345 representing, respectively, the expression states of active, positive, terse, and strong. The expression nodes 330–345 are successors of the emotion and personality nodes 310–325, and capture the probability that the individual would express themselves in an active, positive, strong, and/or terse manner given emotional/personality states. Each of these nodes are binary valued, true or false. Thus, the first stage 305 captures the degree to which an individual with a given personality and in a particular emotional state will tend to communicate in a particular style. (A current implementation includes another expressive style, "formal", which is treated in a manner parallel to "terse" or "active".)

A second stage 350 captures the degree that each paraphrase actually is active, positive, terse, etc. The second stage 350, however, says nothing about the individual, but rather reflects a general cultural interpretation of each paraphrase, that is the degree to which that phrase will be interpreted as active, positive, terse, and so on by a speaker of American English. A node such as "Concept Active" is also binary valued, and is true if the paraphrase would be interpreted as "Active" and false otherwise. The second stage 350 consists of interpretation nodes 352, 354, 356, 358 representing, respectively, the probability that a particular concept or paraphrase from a concept node 360 would be interpreted as having an active positive, strong and terse expressive interpretation.

Finally there is a match layer 370 consisting of a set of nodes 372, 374, 376, 378 for the expression attributes of active, positive, strong and terse, respectively. The nodes 372–378 represent whether a particular expressive interpretation of the paraphrase matches the intended expressive style by the individual for each component. The node 372, "Match Active" has value true if and only if the values of the "Concept Active" node 352 and the "Active Expression" node 330 are the same. The "Match" node 380 at the bottom (output) of the network is simply a Boolean conjunction that has value "true" when all its parents (the match nodes for each component of expressive style) are true.

Thus, the Bayesian belief network fragment of FIG. 3 indicates (1) the relationship of emotion and personality on expressive style, (2) the probability that a modeled concept will be interpreted as a particular style, and (3) whether the interpretation matches the intent for each component and whether they match on all components.

In carrying out the present invention for a particular application (such as troubleshooting), one must generate a network fragment of the type illustrated in FIG. 3 for each possible conceptual command or element in the vocabulary of the application. These fragments are merged into a global Bayesian network capturing the dependencies between the emotional state, personality, natural language, and other behavioral components of the model.

Figure 4:
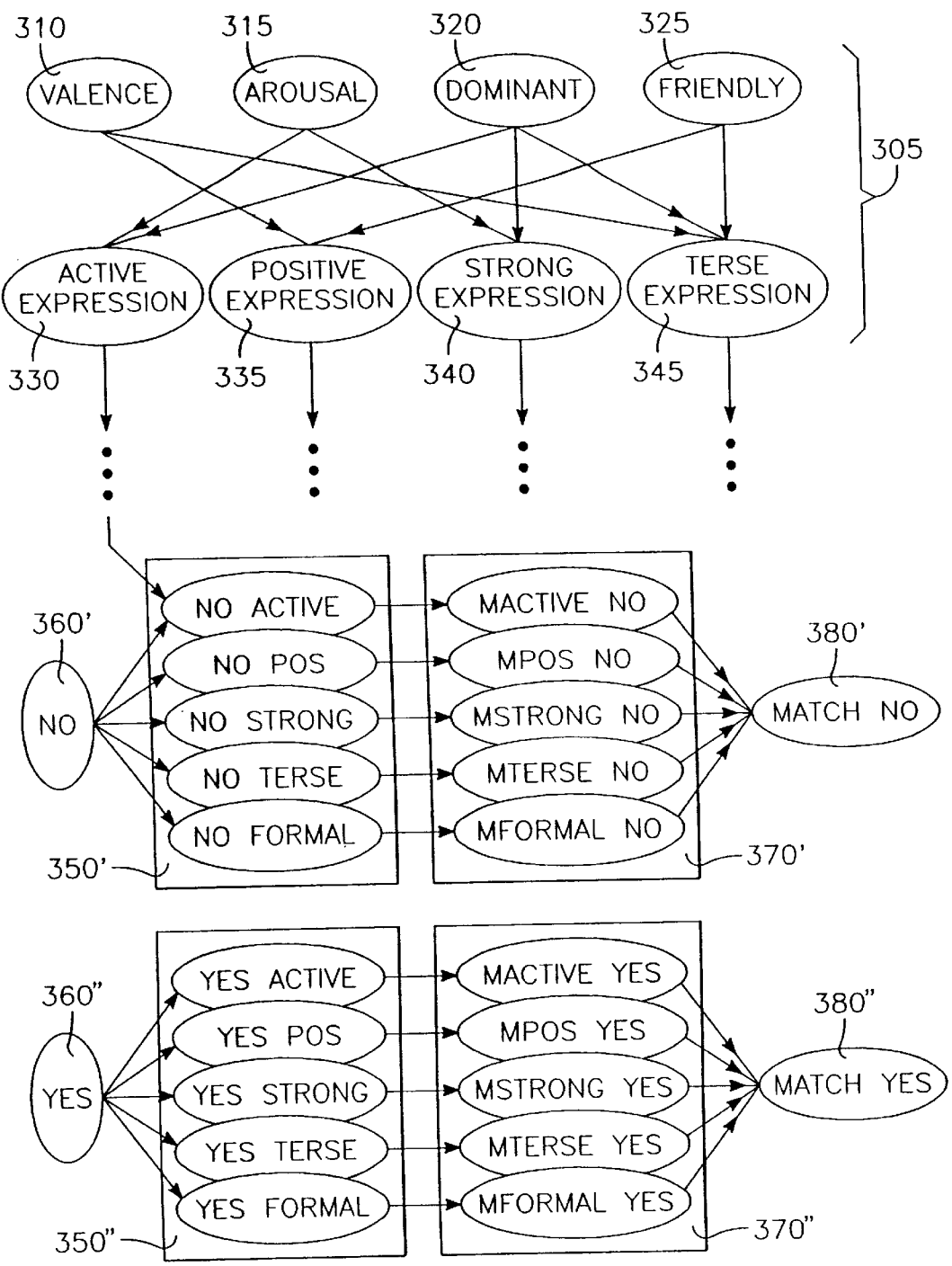
FIG. 4 is a block diagram of a portion of a language submodel in a Bayesian network consisting of many merged fragments of the type illustrated in FIG. 3.

A portion of such a Bayesian network, i.e., one consisting of merged fragments, is shown in FIG. 4. The various fragments differ only in the assessment of the paraphrase scorings, that is the probability that each paraphrase will be interpreted as active, strong, etc. There are five assessments needed for each alternative paraphrase for a concept (the ones mentioned earlier, plus a formality assessment). Note that the size of the belief network representation grows linearly in the number of paraphrases (the number of concepts modeled times the number of paraphrases per concept).

Thus, referring to FIG. 4, the expressive style layer 305 is as described with reference to FIG. 3 and is connected in common to the merged fragments. One of the fragments consists of the concept input node 360' for "no" corresponding to the concept input node 360 of FIG. 3, a "no" interpretation layer 350' corresponding to the interpretation layer 350 of FIG. 3, a "no" match layer 370' corresponding to the match layer 370 of FIG. 3 and a "no" output match node 380' corresponding to the match output node 380 of FIG. 3. Another one of the fragments consists of the concept input node 360" for "yes" corresponding to the concept input node 360 of FIG. 3, a "yes" interpretation layer 350" corresponding to the interpretation layer 350 of FIG. 3, a "yes" match layer 370" corresponding to the match layer 370 of FIG. 3 and a "yes" output match node 380" corresponding to the match output node 380 of FIG. 3.

One could have each of the expressive style nodes pointing directly into the concept node, thus creating, for each concept, a multi-state node with five parents. The assessment burden in this structure would be substantial, and a causal independence assumption such as noisy-or is not appropriate. The preferred embodiment of the present invention reduces this assessment burden, and also allows modular addition of new "expressive style" nodes. If one adds a new expressive style node to the network (such as, for example, "cynical"), then the only additional assessments needed are the "cynical" interpretation nodes of each concept paraphrase. Two examples of assessments of this type are shown in FIGS. 5A and 5B respectively.

In FIG. 5A, various candidate greetings in the column labelled "greet" (e.g., "hello", "hi there", "howdy") are assessed for their terseness and assigned an individual probability (under the columns "true" and "false" for being perceived as being terse, corresponding to the operation of the "terse" interpretation node 358 of FIG. 3. In FIG. 5B, various candidate greetings are assessed for their activeness and assigned an individual probability for being perceived as being active, corresponding to the operation of the "active" interpretation node 352 of FIG. 3. in addition to reducing the assessment burden, such features of the Bayesian network structure of the invention make it easy to extend the model for new concepts and dimensions of expressive style.

Inference:

As discussed above, the merged Bayesian network model relates emotional state and personality to wording choice, speech characteristics, input style characteristics, and body language/movements. Most of these observable expressions are modeled as being directly caused by the components of emotion and personality. For choice of paraphrase we make an additional assumption in using the Bayes net structure described above: the individual being modeled choose wording so as to match the intended interpretation with their current desired expressive style. Thus we are imputing some choice behavior to the individual. This behavior is incorporated into inference by setting the "match" nodes to true before updating probabilities. Students of Bayesian inference will note that in the network in FIG. 4, observing "match" will serve to create the desired dependency between the components of emotion and personality and the choice of paraphrase.

Under this interpretation, the model captures a decision model regarding word selection. The selection of a paraphrase is done such that it maximizes the probability of a match between intended expressive style and interpretation, given all previous observations regarding gesture, speech characteristics, and wording choice. We implement this approach in the network by setting each "Match" node to true. By setting the prior probability of the paraphrases in each concept node to a uniform distribution over the alternatives, application of a standard Bayesian network inference algorithm will generate a posterior distribution over word choices consistent with "match" being true. The paraphrase that has the maximum posterior probability is the one that maximizes the probability of "match" being true. We discuss the use of this technique more fully in the next section where we describe using this model for diagnosis (to determine what mood the user is in) as well as for generating behavior (to determine what should the agent say if he is in a good mood).

Figure 6:
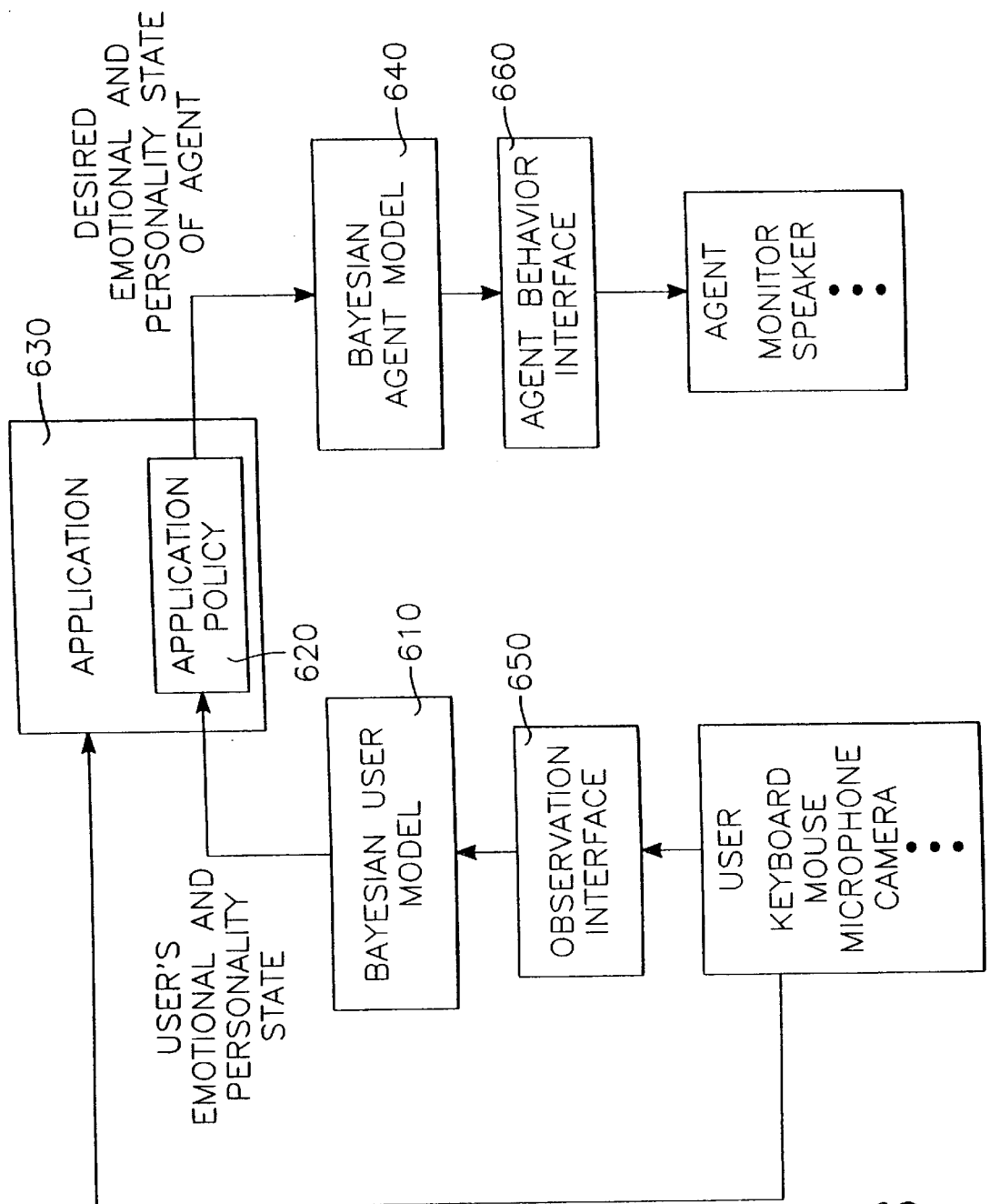
FIG. 6 illustrates one preferred system architecture for carrying out the present invention in a user interface.

Reasoning Architecture:

In providing a user interface of the invention having emotion and personality, it is preferable to maintain two copies of the emotion/personality Bayesian network model of FIG. 2. One copy is used to diagnose the user, the other to generate behavior for the "agent" which is projected back to the user as a voice or as a voice and image, for example. Such an architecture is illustrated in FIG. 6. Referring to FIG. 6, the Bayesian user network model 610 (a copy of the network of FIG. 2) receives inputs from the user interface representing observations of the user's behavior (loud and angry voice tones, or a calm and quiet voice, for example). The model 610 uses such observations to infer the emotional state and personality of the user and sends this information to a response policy module 620 (hereinafter referred to as a "policy module"). The policy module 620 governs the agent behavior or response exhibited to the user (by the computer's user interface) in accordance with, among other things, the user's emotional state and personality. The policy module 620 may be an independent entity but, more likely, is embedded in an application 630 run by the computer. The policy module 620 governs a Bayesian agent network model 640 (another copy of the network of FIG. 2) and informs network 640 what emotional and personality state is to be projected to the user by the agent. The Bayesian agent model 640 responds to this input (defining the emotional and personality state to be projected) by inferring an appropriate behavior for the agent to perform. The observation of the user's behavior is accomplished through a observation interface 650 which can include a microphone and a speech synthesizer, for example. Furthermore, the observation interface 650 may monitor the user's inputs to the application from the user's keyboard and mouse, for example. The agent behavior interface 660 may be implemented by speech made by the computer to the user, as one example.

Operation:

The architecture of FIG. 6 is operated in accordance with the following steps:

(1) Observe. This step refers to recognizing an utterance as one of the possible paraphrases for a concept. At a given point in the dialogue, for example after asking a yes/no question, the speech recognition engine is listening for all possible paraphrases for the speech concepts "yes" and "no". When one is recognized, the corresponding node in the user Bayesian network is set to the appropriate value.

(2) Update. In this step, the invention employs a standard probabilistic inference algorithm to update probabilities of personality and emotional state in the Bayesian user model 610 given the observations. All concept "match" nodes are set to true.

(3) Agent Response. The linkage between the user and agent network models 610, 640 is embedded in the policy module 620. The policy module 620 is the mapping from the updated probabilities of the emotional states and personality of the user (furnished by the Bayesian user model 610) to the desired emotional state and personality of the agent. The policy module 620 can be designed to develop an empathetic agent, whose mood and personality matches that of the user, or a contrary agent, whose emotions and personality tend to be the exact opposite of the user, as two possible examples. Research has indicated that users prefer a computerized agent to have a personality makeup similar to their own, so by default the present implementation of the invention employs a policy module corresponding to an agent having an empathetic response policy. The design of the policy module 620 is up to the system designer, the present invention being compatible with any appropriate policy module.

(4) Propagate. The Bayesian agent network model 640 facilitates probabilistic inference to generate probability distributions over various parameters of behavior including paraphrases, animations, speech characteristics, and so on, consistent with the emotional state and personality set by the policy module 620. Here, again, the "Match" node is set to value true.

(5) Generate Behavior. At a given stage of the dialogue, the task model may dictate that the agent express a particular concept, for example "greet" or "regret". The behavior module then consults the Bayesian agent network model 640 for the current distribution over the possible paraphrases for expressing that concept. Preferably, the paraphrase with the maximum probability from that distribution is selected for agent to speak. This string is then passed to the text-to speech engine in tie user interface to generate the audible output.

For application of the model in computer systems, the current embodiment applies to a command and control scenario where there are relatively few utterances and responses that the agent needs to recognize and respond to. The invention may also be applied to the more general case of dictation-style speech recognition with more complete language grammars.

Figure 7:
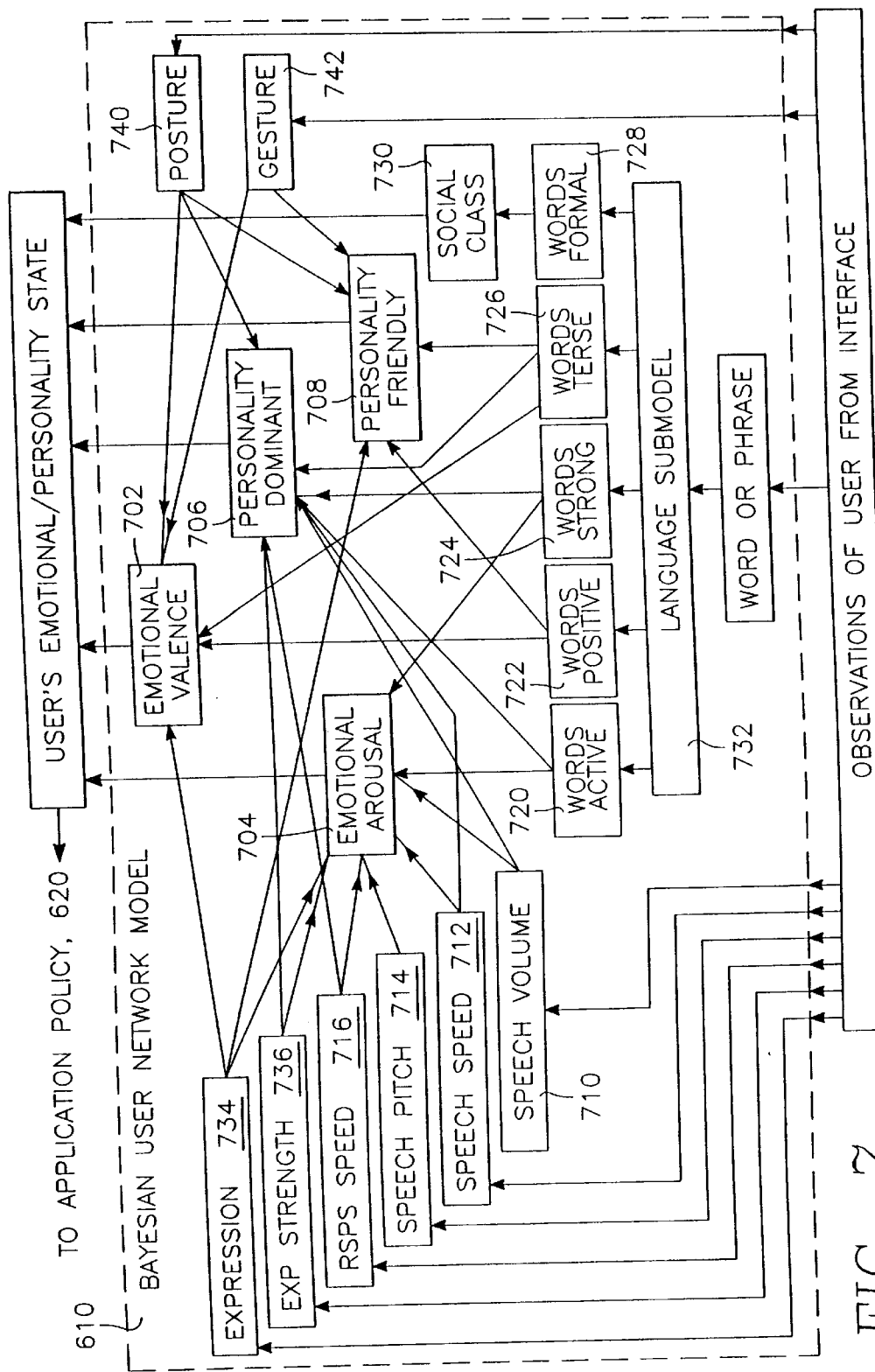
FIG. 7 illustrates a Bayesian network user model in the system architecture of FIG. 6.
Figure 8A:
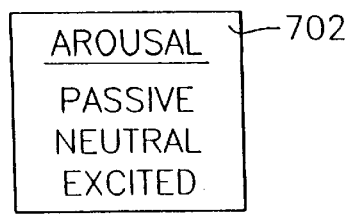
FIGS. 8A, 8B, 8C, and 8D tabulate the states of the emotion/personality nodes in the network of FIG. 7.
Figure 8B:
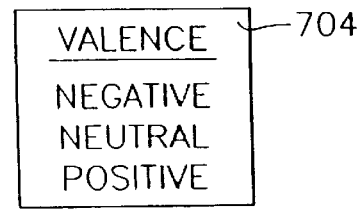
Figure 8C:
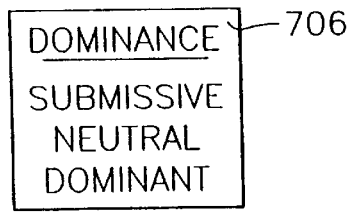
Figure 8D:
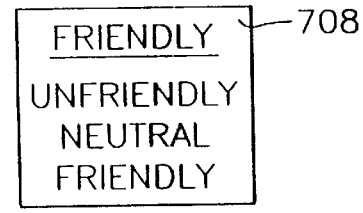

Bayesian User Model:

FIG. 7 illustrates the Bayesian user model 610 which discerns the user's mood (emotional state and personality) from the observed user behavior. The Bayesian net-work of FIG. 7 corresponds to the Bayesian network of FIG. 2, but includes a more robust set of features. The two emotion variables are represented by the an node 702 and a valence node 704. The two personality variables are represented by a dominance node 706 and a friendliness node 708. The states of the four nodes 702–708 are the inferred emotional/personality state of the user. They receive inputs from nodes representing different modes of observed behavior, as follows. The speech of the user can be analyzed in a conventional speech engine to deduce the user's speech volume, speech speed (word rate), pitch and the response speed or promptness, represented by nodes 710, 712, 714, 716, respectively. The nodes 710, 712, 714, 716 receive their inputs from a user interface 718 which may include a speech engine (not shown) which can determine the states of the corresponding variables (i.e., speech speed, volume, speed, pitch and response speed). The four emotion/personality nodes 702–708 also receive inputs from five word attribute nodes including an active word node 720, a positive word node 122, and a strong word node 724 and a terse word node 726. In addition, a third personality node may be defined, namely a social class node 130 which receives its input from another word attribute node, namely a formal word node 728. The five word attribute nodes receive their inputs from a language submodel 732, which corresponds to the interpretation nodes 352–358 of the interpretation layer 350 of the network of FIG. 3. The language submodel 732 assigns to each word or phrase uttered by the user a five-attribute score representing the states of the five word attribute nodes 720–728.

If the user interface 718 has a camera and has the ability to view the user and discern the user's facial expressions, then a facial expression node 734 and a facial expression strength node 736 may be included which receive their inputs from the user interface 718 and provide outputs to appropriate ones of the emotion/personality nodes 702–708, as illustrated in FIG. 7. Alternatively, the expression and expression strength nodes 734 and 736 may take their inputs from the speech engine sensing voice intonations or expressions, and as a second alternative they may take their inputs from both observed facial expression as well as observed voice expression. Likewise, if the user's posture and gestures may be observed by the interface 718, then posture and gesture nodes 740, 742 may be included as well, receiving their inputs from the interface 718 and providing outputs to appropriate ones of the emotion/personality nodes 702–708 as shown in FIG. 7.

States of the Emotion/Personality Variables:

The nodes of the Bayesian network of FIG. 7 correspond to variables whose possible states are selected to represent real transitions in personality, emotion and behavior. Of course, the number of variables and the number of states of each variable could be such large numbers as to render the model assessment task impractical or impossible. Therefore, the variables have been limited in the present embodiment to a relatively small number while their number of states have been limited as well. For example, some variables could be continuous, in which case they have been "quantized" to a limited number of discrete states. The selection of variables and their states has followed no mathematical derivation but is based rather upon a heuristic approach using known principles of psychology discussed previously herein.

Figure 9:
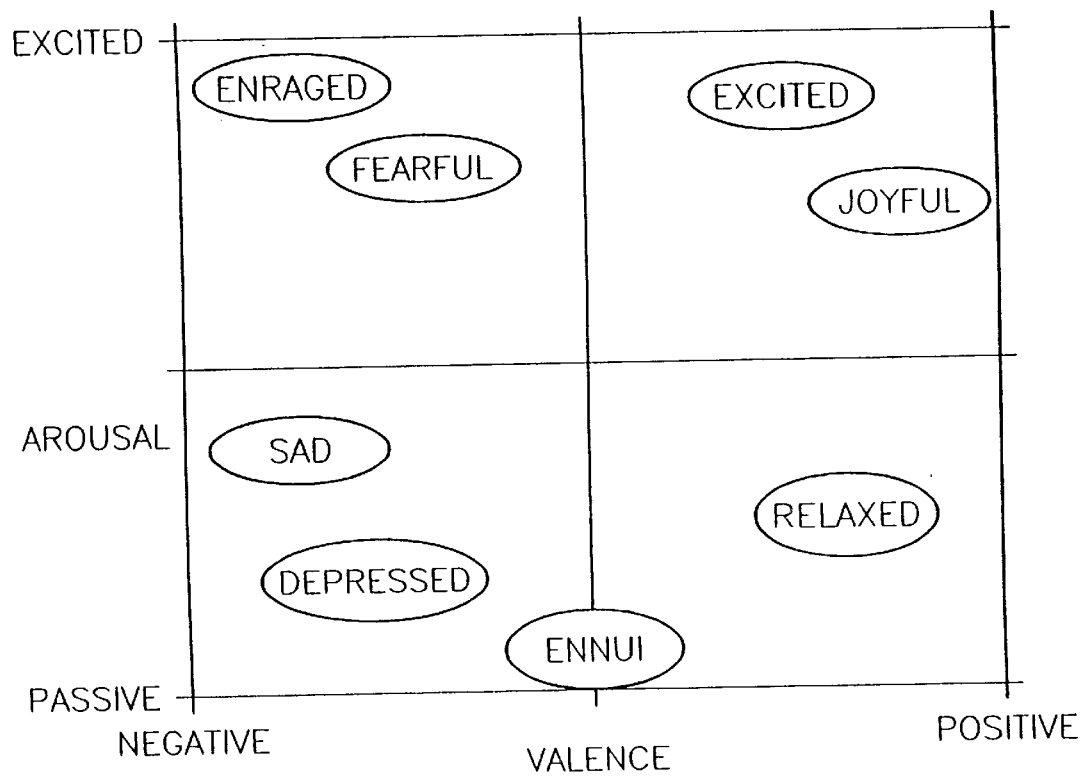
FIG. 9 illustrates the 2-dimensional emotion space implemented in the emotion nodes of the network of FIG. 7.

FIGS. 8A–8D tabulate the states of the four emotion/personality nodes 702–708. The rationale for this structure is well known. One can construct an "emotion" 2-dimensional space defined by the two emotion 3-state variables of valence and arousal as illustrated in FIG. 9, in which the emotional state is determined by the states of the two emotion variables of arousal and valence. Thus, for example, a joyful emotional state occurs when arousal reaches an excited state and valence reaches a positive state, while a sad emotional state occurs when arousal falls to a passive state and valence falls to a negative state. Likewise, one can construct a "personality" 2-dimensional space defined by the two personality 3-state variables of dominance and friendliness as illustrated in FIG. 10. Thus, for example, a gregarious personality state is characterized by a high or "dominant" state of the dominance variable and a high or "friendly" state of friendliness, while an aloof personality state is characterized by a low or "submissive" state of the dominance variable and a low or "unfriendly" state of the friendliness variable.

States of the Expression Variables:

FIGS. 11A and 11B tabulate the states of the expression node 734 and the expression strength node 736. The expression node 734 has six states in FIG. 11A, namely happy, surprise, fear, anger, sad and disgust while the expression strength node 736 has been quantized to three states in FIG. 11B, namely high, medium and low. FIG. 12 tabulates the probabilities stored in the expression node 734 in accordance with a current implementation of the invention. In this implementation, the expression node is linked to only three of the four emotion/personality nodes 702–708, namely the valence, arousal and friendliness nodes 702, 704, 706. FIG. 12 reflects the 27 possible combinations of the states of the three 3-state nodes 702, 704, 706, in that the three states of the arousal node 704 are set forth for each state of the valence node 702 while the three states of the friendliness node 706 are set forth for each of the nine combinations of the valence and arousal node states. For each of the 27 state combinations thus tabulated, a probability is assigned for each one of the five states of the expression node 734, namely happy, surprise, fear, anger, sad and disgust, 734a–734f respectively in FIG. 12. Thus, FIG. 12 tabulates 5(27)=135 individual probabilities. The probability values illustrated in FIG. 12 were assigned heuristically, and a skilled worker could redefine these values in accordance with another heuristic evaluation, and the invention may be carried out with any appropriate array of probability values for the 135 possibilities illustrated in FIG. 12.

While FIG. 12 illustrates one example of how to construct the expression node 734 in the Bayesian network of FIG. 4, it also illustrates a methodology for constructing all of the nodes of FIG. 8: A probability is heuristically assigned by the skilled worker to each possible state of a node for each possible permutation of the states of its antecedent nodes, based upon a qualitative knowledge of psychology. The probabilities thus assigned form an array of probability values which is stored in the corresponding node in the Bayesian network of FIG. 4. In addition, if data is available, these conditional probabilities can be "learned" or estimated from observational data.

States of the Word Interpretation Variables:

The five variables characterizing word interpretation, represented by the active, positive, strong, terse and formal word nodes 720, 722, 724, 726 and 728, respectively could each have any number of states convenient to the skilled worker. In the present implementation, the assessment burden is greatly reduced by constructing these nodes to have only two states, namely true and false. These binary states of the five word interpretation variables 720–728 are tabulated in FIGS. 13A–13D, respectively. The skilled worker assigns a probability to each state of the five word interpretation nodes 720–728 for each combination of states of the emotion/personality nodes 702–708, 728. These assignments are independent of the chosen words or phrases, and simply refer to the type of phrases or words most likely employed to express a particular emotion/personality state. The resulting probabilities are stored in appropriate ones of the five word interpretation nodes 720–728.

The word interpretation nodes 720–728 interact between the five emotion/personality nodes 702–708,730 and the language submodel 732.

Language Submodel:

For each word or phrase to be interpreted by the Bayesian network of FIG. 3, a probability assessment is made by the skilled worker whether or not that word or phrase is active, another decision is made whether that same word or phrase is positive, and so forth, a probability is assigned for each of the five word interpretation attributes of active, positive, strong, terse and formal. As previously discussed in this specification, it is preferable that these decisions are made by the skilled worker in light of common language usage, independently of any personality type or emotional state of the user. The resulting assessments are stored as numerical information in the language submodel 732, as shown in FIG. 5A and 5B.

Figure 14:
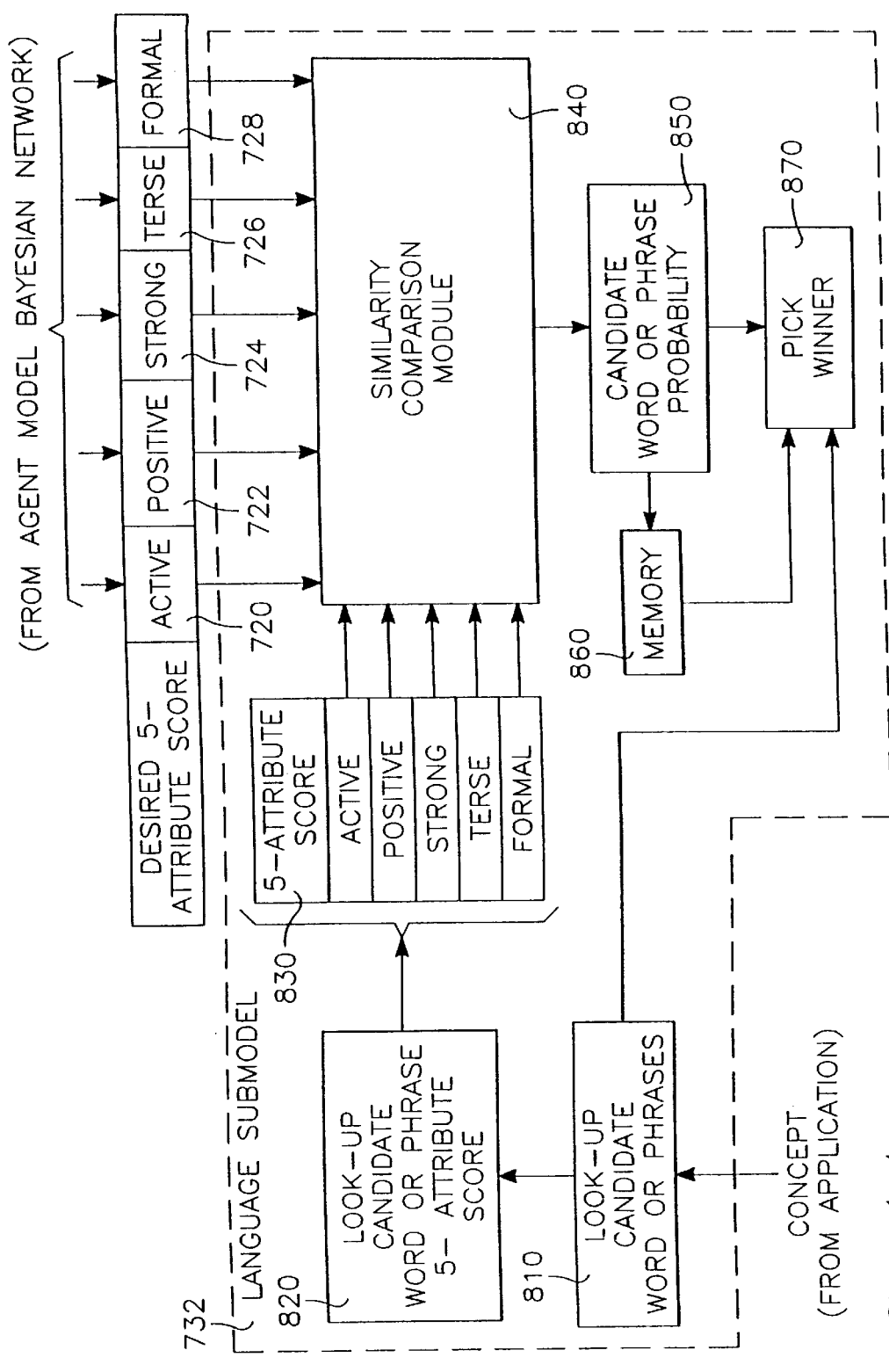
FIG. 14 is a block diagram illustrating a possible implementation of the language submodel in the network of FIG. 7.
Figure 16A:
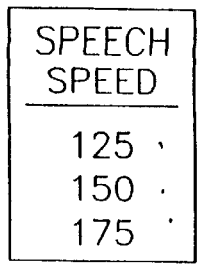
FIGS. 16A–16G tabulate the states of the remaining nodes of the network of FIG. 7.
Figure 16B:
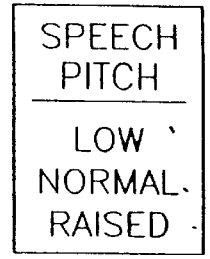
Figure 16C:
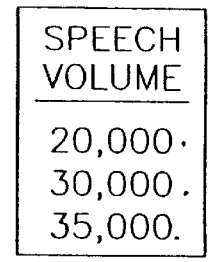
Figure 16D:
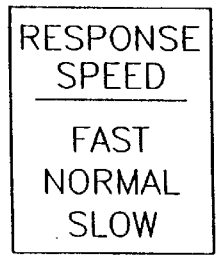
Figure 16E:
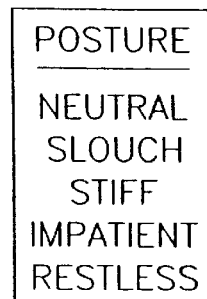
Figure 16F:
Figure 16G:
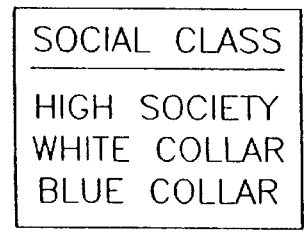

FIG. 14 illustrates one possible implementation of the language submodel 732. The language submodel 732 includes a candidate phrase look-up table 810 which can receive a concept to be expressed (such as "greeting") and look up the various alterative expressions of that concept (such as those listed in FIGS. 5A and 5B). A 5-attribute score look-up table 820 receives each candidate phrase from the candidate phrase look-up table 810 and finds, for each candidate phrase, a score (e.g., a binary score such as 1 or 0) for each of the five word interpretation attributes of active, positive, strong, terse and formal. The result is output by the 5-attribute score look-up table 820 as a 5-score data structure 830. A match or similarity comparison module 840 compares each entry in the 5-score data structure with the state of the corresponding one of the five word interpretation nodes 720–728. In a simple embodiment, the match module 840 scores a "1" for each of the five entries in the data structure 830 having the same binary value as the state of the corresponding one of the word interpretation node 720–728. A candidate probability module 850 sums the scores for each candidate phrase and stores the result as a probability in a memory 860. After all the candidate phrases have been thus evaluated, a-pick winner module 870 reviews all of the probabilities stored in the memory 860 and picks the candidate phrase from the look-up table 810 having the "best" probability in the memory 860. In the simplest implementation, the "best" probability is the highest probability (i.e., the highest sum of scores). Other implementations may employ a different rule to define the "best" score.

FIG. 15 illustrates one example of how the score-sums or probabilities stored in the memory 860 may be distributed over the possible candidate phrases for a given concept for a given state of the five word interpretation nodes 720–728. The number of candidate phrases is, theoretically, unlimited, while the probability or score sum stored in the memory 860 for each candidate ranges from 0 to 5 in the binary implementation.

States of the Speech and Gesture Variables:

The speech nodes, including speech speed, speech pitch and speech volume have the states illustrated in FIGS. 16. The response speed node, which characterizes how fast or quick a response is given, is reflected by the response speed node whose states are tabulated in FIG. 16D. The posture node has five states tabulated in FIG. 16E while the gesture node has four states tabulated in FIG. 16F. The social class node (which is linked to the word formality node) has three states tabulated in FIG. 16G.

Figure 17:
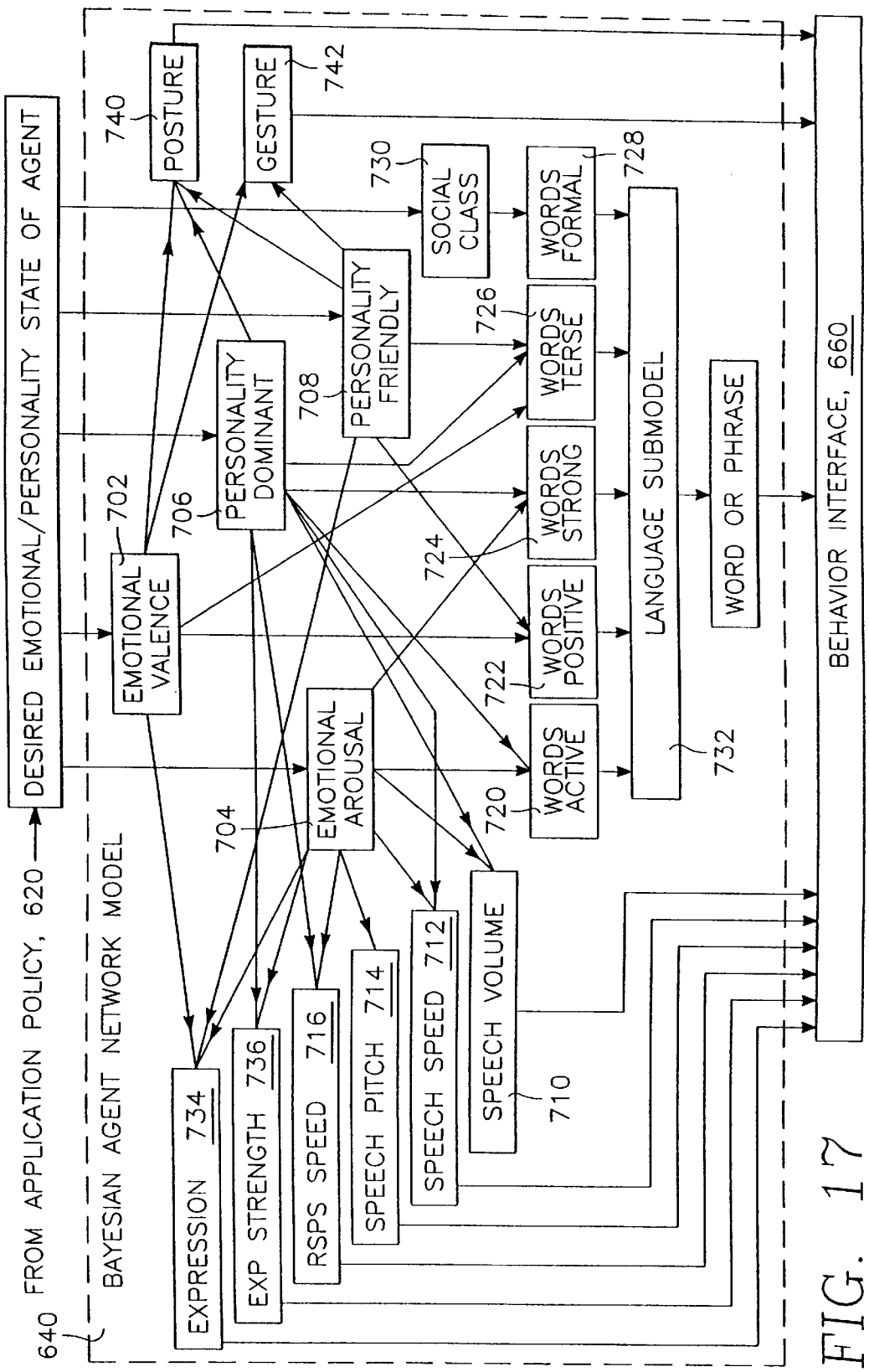
FIG. 17 is a block diagram of the agent Bayesian network model in the system of FIG. 6.

The Bayesian Agent Network Model:

FIG. 17 illustrates the Bayesian Agent Network Model 640 of FIG. 6. Preferably, the internal structure of the model 640 is generally the same as the user model 610 of FIG. 7. The main difference is that the model is operated in the opposite direction. Specifically, the emotion/personality nodes 702–708, 730 have their states dictated by the policy module 620 and they dictate, in turn, the states of the other nodes controlling behavior. Thus, the emotion/personality nodes 702–708, 730 receive inputs from the policy module 620 and have outputs connected to the inputs of the other nodes in the network. For example, the speech interpretation nodes 720–728 have their inputs connected to the emotion/personality nodes and their outputs connected to the language submodel 732. The language submodel 732, as well as the remaining nodes in the network of FIG. 17 have their outputs connected to the agent behavior interface 660. The behavior interface 660 governs, for example, the audible output of the user interface of the computer.

Working Example of a Bayesian Network in the Invention:

The two Bayesian networks of FIGS. 7 and 17 are used to perform inferencing in opposite directions, as mentioned above. Specifically, the Bayesian network of FIG. 7 is employed to perform inferencing from the behavioral nodes toward the emotion/personality nodes so as to infer an emotional/personality state from observed behavior, while the Bayesian network of FIG. 17 is employed to perform inferencing from the emotion/personality nodes toward the behavioral nodes so as to infer a behavioral state from a dictated emotional/personality state. However, the structure of the two networks can be generally the same. The network of FIG. 7 is updated to reflect the changing moods of the human user, while the network of FIG. 17 is updated to reflect the immediate goals of the policy module. Therefore, the states of the various nodes in the two networks of FIGS. 7 and 17 will differ necessarily as operation proceeds, but the internal structure, including the probabilities stored in each node, are preferably the same in both networks (i.e., the network of FIG. 7 and the network of FIG. 17). A working example of such a structure is now set forth. It is understood that the skilled worker may improve and modify greatly this structure in carrying out the present invention.

The exemplary structure is defined below in tabular form, with the states of the variables being listed in the order in which their probabilities are listed for each node for each configuration of states of the parent nodes.

States of the Nodes node Valence
  "Negative",
  "Neutral",
  "Positive"
node Arousal
  "Passive",
  "Neutral",
  "Excited"
node Dominant
  "Submissive",
  "Neutral",
  "Dominant"
node Friendly
  "Unfriendly",
  "Neutral",
  "Friendly"
node Expression
  "happy",
  "Surprised",
  "Fear",
  "Anger",
  "Sad",
  "Disgust"
node ExpressionStrength
  "High",
  "Medium",
  "Low"
node positive
  "yes",
  "no"
  category: "wordstyle";
node Active
  "yes",
  "no"
  category: "wordstyle";
node Strong
  "yes",
  "no"
  category:. "wordstyle";
node Terse
  "yes",
  "no"
  category: "wordstyle";
node Formal
  "yes",
  "no"
  category: "wordstyle";
node SpeechVolume
  "% Vol=20000%",
  "% Vol=30000%",
  "% Vol=35000%"
node SpeechSpeed
  "% spd=125%",
  "% spd=150%",
  "% spd=175%"
node SpeechPitch
  "Normal",
  "Raised"
node SocialClass
  "High Society",
  "White Collar",
  "Blue Collar"
node ResponseSpeed
  "Fast",
  "Normal",
  "Slow"
node Posture
  "Neutral",
  "Slouch",
  "Stiff",
  "Impatient",
  "Restless"

node Gesture
"Relax",
"Wave",
"Point",
"Beat",
"Fold",
"HandsBehind",
"Shrug"
node PersonalityAssed
name: "PersonalityConfidence";
"Low",
"Medium",
"High"

Structure of the Nodes
probability(Expression|Valence, Arousal, Friendly)
(0, 0, 0): 0.0178117, 0.0226973, 0.254758, 0.362545, 0.223613, 0.118575;
(0, 0, 1): 0.0178117, 0.0226973, 0.329262, 0.293919, 0.255598, 0.0807123;
(0, 0, 2): 0.0178117, 0.0226973, 0.360941, 0.232316, 0.317659, 0.0485749;
(0, 1, 0): 0.0178117, 0.0361324, 0.22743, 0.422316, 0.14659, 0.14972;
(0, 1, 1): 0.0178117, 0.0361324, 0.237812, 0.435827, 0.175674, 0.0967429;
(0, 1, 2): 0.0178117, 0.0361324, 0.285903, 0.382239, 0.201476, 0.0764376;
(0, 2, 0): 0.0201018, 0.0836133, 0.145369, 0.443461, 0.108804, 0.198651;
(0, 2, 1): 0.0201018, 0.0836133, 0.184224, 0.492544, 0.116057, 0.10346;
(0, 2, 2): 0.0201018, 0.0836133, 0.215369, 0.454529, 0.168118, 0.0582692;
(1, 0, 0): 0.11799, 0.212612, 0.149246, 0.149246, 0.22166, 0.149246;
(1, 0, 1): 0.360484, 0.127903, 0.127903, 0.127903, 0.127903, 0.127903;
(1, 0, 2): 0.679995, 0.0651819, 0.0637057, 0.0637057, 0.0637057, 0.0637057;
(1, 1, 0): 0.0971815, 0.169679, 0.169679, 0.169679, 0.224102, 0.169679;
(1, 1, 1): 0.259975, 0.134693, 0.153689, 0.160155, 0.161361, 0.130126;
(1, 1, 2): 0.528219, 0.0858694, 0.09798, 0.102102, 0.102871, 0.0829581;
(1, 2, 0): 0.0544722, 0.180074, 0.180074, 0.180074, 0.225232, 0.180074;
(1, 2, 1): 0.165293, 0.166941, 0.166941, 0.166941, 0.166941, 0.166941;
(1, 2, 2): 0.30743, 0.138514, 0.138514, 0.138514, 0.138514, 0.138514;
(2, 0, 0): 0.149254, 0.179469, 0.154404, 0.154404, 0.208064, 0.154404;
(2, 0, 1): 0.281912, 0.209476, 0.127153, 0.127153, 0.127153, 0.127153;
(2, 0, 2): 0.494554, 0.16575, 0.0849239, 0.0849239, 0.0849239, 0.0849239;
(2, 1, 0): 0.301301, 0.193078, 0.117842, 0.117842, 0.152094, 0.117842;
(2, 1, 1): 0.473561, 0.147629, 0.0947026, 0.0947026, 0.0947026, 0.0947026;
(2, 1, 2): 0.590348, 0.131858, 0.0694485, 0.0694485, 0.0694485, 0.0694485;
(2, 2, 0): 0.380913, 0.179435, 0.102019, 0.102019, 0.133594, 0.102019;
(2, 2, 1): 0.628553, 0.120285, 0.0627905, 0.0627905, 0.0627905, 0.0627905;
(2, 2, 2): 0.841709, 0.0694659, 0.0222063, 0.0222063, 0.0222063, 0.0222063;}
probability(ExpressionStrength|Arousal, Dominant)
(0, 0): 0.154784, 0.293715, 0.551501;
(0, 1): 0.251501, 0.302341, 0.446158;
(0, 2): 0.333333, 0.333333, 0.333333;
(1, 0): 0.246463, 0.356845, 0.396692;
(1, 1): 0.333333, 0.333333, 0.333333;
(1, 2): 0.399288, 0.348753, 0.251959;
(2, 0): 0.333333, 0.333333, 0.333333;
(2, 1): 0.399899, 0.354669, 0.245432;
(2, 2): 0.545089, 0.30257, 0.152341;
probability(Positive|Valence, Friendly)
(0, 0): 0.0212214, 0.978779;
(0, 1): 0.101145, 0.898855;
(0, 2): 0.298626, 0.7013714;
(1, 0): 0.0719847, 0.928015;
(1, 1): 0.355496, 0.644504;
(1, 2): 0.73855, 0.26145;
(2, 0): 0.328855, 0.671145;
(2, 1): 0.614504, 0.385496;
(2, 2): 0.976183, 0.0238166;
probability(Active|Arousal, Dominant) (0, 0): 0.124657, 0.875343;
(0, 1): 0.23771, 0.76229;
(0, 2): 0.429542, 0.570458;
(1, 0): 0.254886, 0.745114;
(1, 1): 0.506412, 0.493588;
(1, 2): 0.820611, 0.179389;
(2, 0): 0.604215, 0.395725;
(2, 1): 0.75855, 0.24145;
(2, 2): 0.90397, 0.0960303;
probability(Strong|Arousal, Dominant)
(0, 0): 0.184885, 0.815115;
(0, 1): 0.300076, 0.699924;
(0, 2): 0.779618, 0.220382;
(1, 0): 0.40084, 0.59916;
(1, 1): 0.519618, 0.480382;
(1, 2): 0.869848, 0.130152;
(2, 0): 0.582137, 0.417863;
(2, 1): 0.726107, 0.273893;
(2, 2): 0.918245, 0.0817554;
probability(Terse|Dominant, Valence, Friendly)
(0, 0, 0): 0.866108, 6.133892;
(0, 0, 1): 0.721299, 0.278701;
(0, 0, 2): 0.61794, 0.38206;
(0, 1, 0): 0.733284, 0.266716;
(0, 1, 1): 0.530917, 0.469083;
(0, 1, 2): 0.325726, 0.674274;
(0, 2, 0): 0.592367, 0.407633;
(0, 2, 1): 0.413742, 0.586258;
(0, 2, 2): 0.287863, 0.712137;
(1, 0, 0): 0.799542, 0.200458;
(1, 0, 1): 0.667023, 0.332977;
(1, 0, 2): 0.531298, 0.468702;
(1, 1, 0): 0.692443, 0.307557;

(1, 1, 1): 0.450458, 0.549542;
(1, 1, 2): 0.263359, 0.736641;
(1, 2, 0): 0.321985, 0.678015;
(1, 2, 1): 0.321985, 0.678015;
(1, 2, 2): 0.333206, 0.666794;
(2, 0, 0): 0.877252, 0.122748;
(2, 0, 1): 0.877252, 0.122748;
(2, 0, 2): 0.877252, 0.122748;
(2, 1, 0): 0.680535, 0.319465;
(2, 1, 1): 0.680535, 0.319465;
(2, 1, 2): 0.680535, 0.319465;
(2, 2, 0): 0.512138, 0.487862;
(2, 2, 1): 0.512138, 0.487862;
(2, 2, 2): 0.512138, 0.487862;
probability(Formal|SocialClass)
(0): 0.886489, 0.113511;
(1): 0.465725, 0.534275;
(2): 0.204504, 0.795496;
probability(SpeechVolume|Arousal, Dominant)
(0, 0): 0.668601, 0.277685, 0.0537145;
(0, 1): 0.546082, 0.400204, 0.0537145;
(0, 2): 0.446998, 0.499288, 0.0537145;
(1, 0): 0.0544786, 0.894708, 0.0508136;
(1, 1): 0.0544786, 0.894708, 0.0508136;
(1, 2): 0.0544786, 0.894708, 0.0508136;
(2, 0): 0.0534097, 0.500204, 0.446386;
(2, 1): 0.0534097, 0.396387, 0.550203;
(2, 2): 0.0534097, 0.275319, 0.671272;
probability(SpeechSpeed|Arousal, Dominant)
(0, 0): 0.751654, 0.194784, 0.0535616;
(0, 1): 0.665929, 0.280509, 0.0535616;
(0, 2): 0.549822, 0.396616, 0.0535616;
(1, 0): 0.207532, 0.724402, 0.0680658;
(1, 1): 0.0540968, 0.87944, 0.0664627;
(1, 2): 0.0476082, 0.740967, 0.211425;
(2, 0): 0.0460052, 0.400738, 0.553257;
(2, 1): 0.0460052, 0.285166, 0.668829;
(2, 2): 0.0460052, 0.207761, 0.746234;
probability(SpeechPitch|Arousal)
(0): 0.798703, 0.201297;
(1): 0.5, 0.5;
(2): 0.328168, 0.671832;
probability(SocialClass)
0.0960815, 0.806463, 0.0974553;
probability(ResponseSpeed|Arousal, Dominant)
(0, 0): 0.00989832, 0.0894406, 0.900661;
(0, 1): 0.0129008, 0.389568, 0.597531;
(0, 2): 0.0499746, 0.500891, 0.449134;
(1, 0): 0.0319595, 0.640051, 0.327989;
(1, 1): 0.0349365, 0.935776, 0.0292871;
(1, 2): 0.333333, 0.640357, 0.0263098;
(2, 0): 0.454555, 0.496539, 0.0489057;
(2, 1): 0.601883, 0.392952, 0.00516483;
(2, 2): 0.895853, 0.0915773, 0.0125696;
probability(Posture|Valence, Dominant, Friendly)
(0, 0, 0): 0.246991, 0.58823, 0.052014, 0.0796421, 0.0331224;
(0, 0, 1): 0.255657, 0.608868, 0.0538389, 0.041352, 0.0342845;
(0, 0, 2): 0.341415, 0.502941, 0.0444723, 0.039114, 0.0720581;
(0, 1, 0): 0.212395, 0.327482, 0.140184, 0.140363, 0.179575;
(0, 1, 1): 0.292453, 0.445655, 0.0798784, 0.0702542, 0.11176;
(0, 1, 2): 0.348018, 0.442555, 0.0732893, 0.033598, 0.10254;
(0, 2, 0): 0.227605, 0.25872, 0.283321, 0.199831, 0.0305227;
(0, 2, 1): 0.250647, 0.284912, 0.252706, 0.178122, 0.0336127;
(0, 2, 2): 0.2921, 0.332031, 0.21157, 0.125127, 0.0391716;
(1, 0, 0): 0.731904, 0.123253, 0.0981535, 0.0326996, 0.0139894;
(1, 0, 1): 0.767437, 0.129237, 0.0664754, 0.0221819, 0.0146685;
(1, 0, 2): 0.795237, 0.133919, 0.0326589, 0.0229854, 0.0151999;
(1, 1, 0): 0.788574, 0.0684533, 0.0905728, 0.0373275, 0.0150725;
(1, 1, 1): 0.818703, 0.0710687, 0.0709161, 0.0236637, 0.0156484;
(1, 1, 2): 0.840363, 0.0729489, 0.0463362, 0.0242897, 0.0160624;
(1, 2, 0): 0.625162, 0.081973, 0.1480715, 0.0968897, 0.0479007;
(1, 2, 1): 0.668007, 0.0875911, 0.129177, 0.0640408, 0.0511836;
(1, 2, 2): 0.704837, 0.0924202, 0.0987455, 0.0499922, 0.0540055;
(2, 0, 0): 0.196144, 0.295268, 0.201351, 0.116612, 0.190625;
(2, 0, 1): 0.217307, 0.327126, 0.197928, 0.0875395, 0.170099;
(2, 0, 2): 0.244668, 0.368315, 0.172976, 0.0733075, 0.140734;
(2, 1, 0): 0.203586, 0.119234, 0.329657, 0.110359, 0.237164;
(2, 1, 1): 0.230501, 0.11371, 0.294418, 0.0928544, 0.268511;
(2, 1, 2): 0.223655, 0.168063, 0.285673, 0.0620676, 0.260541;
(2, 2, 0): 0.168096, 0.0861761, 0.364067, 0.185242, 0.195819;
(2, 2, 1): 0.193637, 0.0999605, 0.341657, 0.139173, 0.225573;
(2, 2, 2): 0.208272, 0.107516, 0.31986, 0.121729, 0.242622;
probability(Gesture|Valence, Friendly)
(0, 0): 0.224919, 0.0214209, 0.214209, 0.0321313, 0.214209, 0.23563, 0.0574816;
(0, 1): 0.189346, 0.0256489, 0.150178, 0.101735, 0.251902, 0.255579, 0.0256106;
(0, 2): 0.882629, 0.0163356, 0.0213402, 0.0213402, 0.0165993, 0.017252, 0.0245041;
(1, 0): 0.189346, 0.0256489, 0.150178, 0.101735, 0.251902, 0.255579, 0.0256106;
(1, 1): 0.882629, 0.0163356, 0.0213402, 0.0213402, 0.0165993, 0.017252, 0.0245041;
(1, 2): 0.384136, 0.0725131, 0.071723, 0.238388, 0.0830207, 102319, 0.0478998;
(2, 0): 0.882629, 0.0163356, 0.0213402, 0.0213402, 0.0165993, 0.017252, 0.0245041;
(2, 1): 0.384136, 0.0725131, 0.071123, 0.238388, 0.0830207, 0.102319, 0.0478998;

(2, 2): 0.0816913, 0.17196, 0.0540413, 0.334838, 0.0548546, 0.0635674, 0.239047;}

Other Embodiments of the Invention:

While the invention has been described with reference to a preferred embodiment in which the model networks are Bayesian networks, the invention may be carried out in a different manner using models other than Bayesian networks, such as Markov chains. In fact, the invention is not confined to any particular model type by may be carried out using any suitable stochastic model.

While the invention has been described in detail with reference to preferred embodiments, it is understood that variations and modifications thereof may be made without departing from the true spirit and scope of the invention.

What is claimed is:

1. A computer user interface capable of sensing user emotional and personality states and conveying them to a computer application for processing, comprising:

an observer capable of observing user behavior;

an observing network facilitating inferencing user emotional and personality states from said behavior observed by said observer; and said observing network capable of conveying to said computer application the user emotional and personality states inferred by said observing network for processing by said application.

2. The user interface of claim 1 wherein said network comprises a stochastic model.

3. The user interface of claim 2 wherein said stochastic model comprises a Bayesian network.

4. The user interface of claim 3 wherein said Bayesian network comprises:

a first layer of multi-state nodes representing respective emotional and personality variables having outputs connected to said policy module; and a second layer of multi-state nodes representing respective behavioral variables having inputs connected to said observer, wherein each one of said nodes comprises probabilities linking each state in the one node with states of others of said nodes.

5. The user interface of claim 4 wherein:

the probabilities in each one of said nodes in said first layer links the states of said one first layer node to the states of nodes in said second layer; and the probabilities in each one of said nodes in said second layer link the states of said one second layer node to states of nodes in said first layer.

6. The user interface of claim 4 wherein said multi-state nodes representing emotional and personality variables comprise at least one of: (a) a valence node, (b) an arousal node, (c) a friendliness node and (d) a dominance node.

7. The user interface of claim 4 wherein said multi-state nodes representing behavior variables comprise at least one of: (a) a speech attribute node, (b) a facial expression node, (c) a word attribute node.

8. The user interface of claim 4 wherein said multi-state nodes representing behavioral variables comprise a set of word attribute nodes having probabilities relating states of said emotional and personality variables to a set of corresponding word attributes, said interface further comprising:

a language submodel coupled to said word attribute nodes; and a word node coupled to said language submodel.

9. The user interface of claim 8 wherein said set of word attributes comprise at least plural ones of: (a) terseness, (b) positiveness, (c) activeness, (d) strength and (e) formality.

10. The user interface of claim 9 wherein said language submodel comprises:

a word attribute layer relating individual word expressions to probabilities of conveying particular ones of said set of word attributes;

a scoring layer relating states of said word attribute layer for a particular word expression to states of corresponding ones of said set of word attribute nodes of said network.

11. The user interface of claim 10 wherein said language submodel further comprises a match module selecting a word expression having a winning score computed by said scoring layer.

12. A method of operating a computer user interface in support of a computer application, comprising:

providing a user model stochastic network;

inferring, in said user model stochastic network, user emotion and personality states from observed user behavioral states;

transmitting, to said application, said user emotional and personality states for processing by said application.

13. Computer-readable media storing instructions for carrying out the steps of claim 12.

14. The method of claim 12 wherein the step of providing a user model stochastic network comprises:

providing a first layer of multi-state nodes representing respective emotional and personality variables; and providing a second layer of multi-state nodes representing respective behavioral variables.

15. The method of claim 14 wherein:

the step of providing said first layer of nodes comprises providing probabilities linking the states of said one first layer node to the states of nodes in said second layer; and the step of providing said second layer of nodes comprises providing probabilities linking the states of said one second layer node to states of nodes in said first layer.

16. The method of claim 14 wherein the step of providing multi-state nodes representing emotional and personality variables comprise providing at least one of: (a) a valence node, (b) an arousal node, (c) a friendliness node and (d) a dominance node.

17. The method of claim 16 wherein the step of providing multi-state nodes representing behavior variables comprises providing at least one of: (a) a speech attribute node, (b) a facial expression node, (c) a word attribute node.

18. The method of claim 14 wherein the step of providing multi-state nodes representing behavioral variables comprises providing a set of word attribute nodes having probabilities relating states of said emotional and personality variables to a set of corresponding word attributes, said method further comprising:

providing a language submodel coupled to said word attribute nodes; and providing a word node coupled to said language submodel.

19. The method of claim 18 wherein the step of providing a set of word attributes comprises providing at least plural ones of: (a) terseness, (b) positiveness, (c) activeness, (d) strength and (e) formality.

20. The method of claim 18 wherein the step of providing said language submodel comprises:

providing a word attribute layer relating individual word expressions to probabilities of conveying particular ones of said set of word attributes; and providing a scoring layer relating states of said word attribute layer for a particular word expression to states of corresponding ones of said set of word attribute nodes of said network.

21. The method of claim 20 wherein the step of providing said language submodel further comprises providing a match module capable of selecting a word expression having a winning score computed by said scoring layer.

* * * * *

UNITED STATES PATENT AND TRADEMARK OFFICE
CERTIFICATE OF CORRECTION

PATENT NO. : 5,987,415

DATED : November 16, 1999

INVENTOR(S) : John S. Breese, John Eugene Ball

Page 1 of 2

It is certified that error appears in the above-identified patent and that said Letters Patent is hereby corrected as shown below:

| | | |
|---|---|---|
| Column 1, | line 10 | After "there", insert --is--; |
| | line 33 | Change "rattler" to --rather--; |
| | line 40 | Change "(.e.g." to --(e.g.--; |
| Column 3, | line 45 | Change "Lie" to --lie--; |
| Column 5, | line 32 | Change "tie" to --the--; |
| Column 9, | line 56 | Change "es inmate" to --estimate--; |
| Column 10, | line 57 | After "active", insert --,--; |
| Column 11, | line 67 | Change "in" to --In--; |
| Column 13, | line 60 | Change "tie" to --the--; |
| Column 14, | line 4 | Change "net-work" to --network--; |
| Column 20, | line 18 | Change "0.7013714" to --0.701374--; |
| | line 32 | Change "0.604215" to --0.604275--; |
| | line 46 | Change "6.133892" to --0.133892--; |
| Column 21, | line 66 | Change "0.041352" to --0.047352--; |

UNITED STATES PATENT AND TRADEMARK OFFICE
CERTIFICATE OF CORRECTION

PATENT NO. : 5,987,415
DATED : November 16, 1999
INVENTOR(S) : John S. Breese, John Eugene Ball It is certified that error appears in the above-identified patent and that said Letters Patent is hereby corrected as shown below:

Column 22, line 27    Change "0.1480715" to --0.148075--;
          line 42    Change "0.268511" to --0.268517--; and
          line 66    Change "0.071123" to --0.071723--.

Signed and Sealed this

Twenty-ninth Day of August, 2000

Attest:

Q. TODD DICKINSON

*Attesting Officer*    *Director of Patents and Trademarks*